March 28, 1944. J. B. ARMITAGE ET AL 2,345,171
MACHINE TOOL TRANSMISSION AND CONTROL MECHANISM
Filed Feb. 11, 1939 6 Sheets-Sheet 1
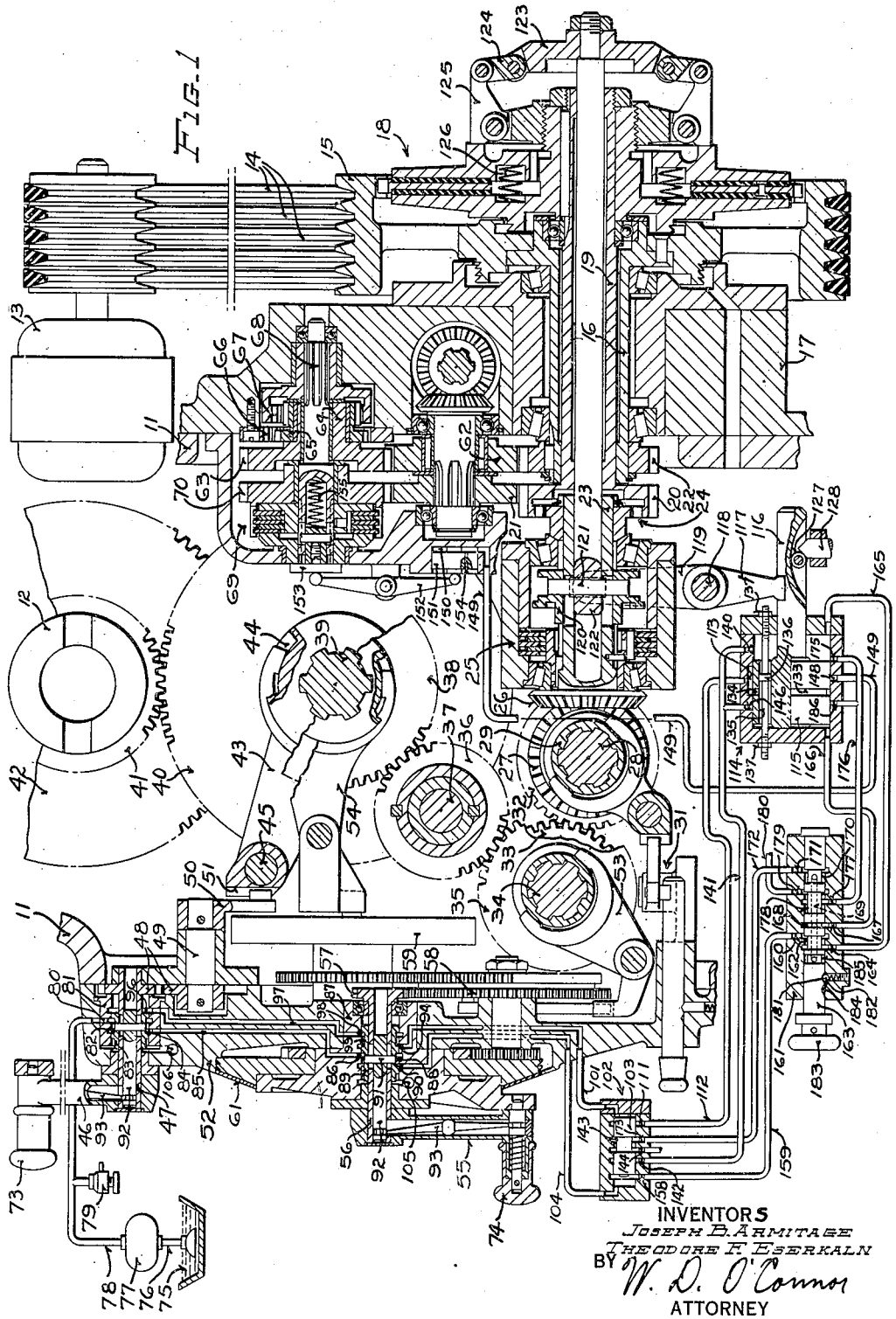
INVENTORS
Joseph B. Armitage
Theodore F. Eserkaln
BY W. D. O'Connor
ATTORNEY

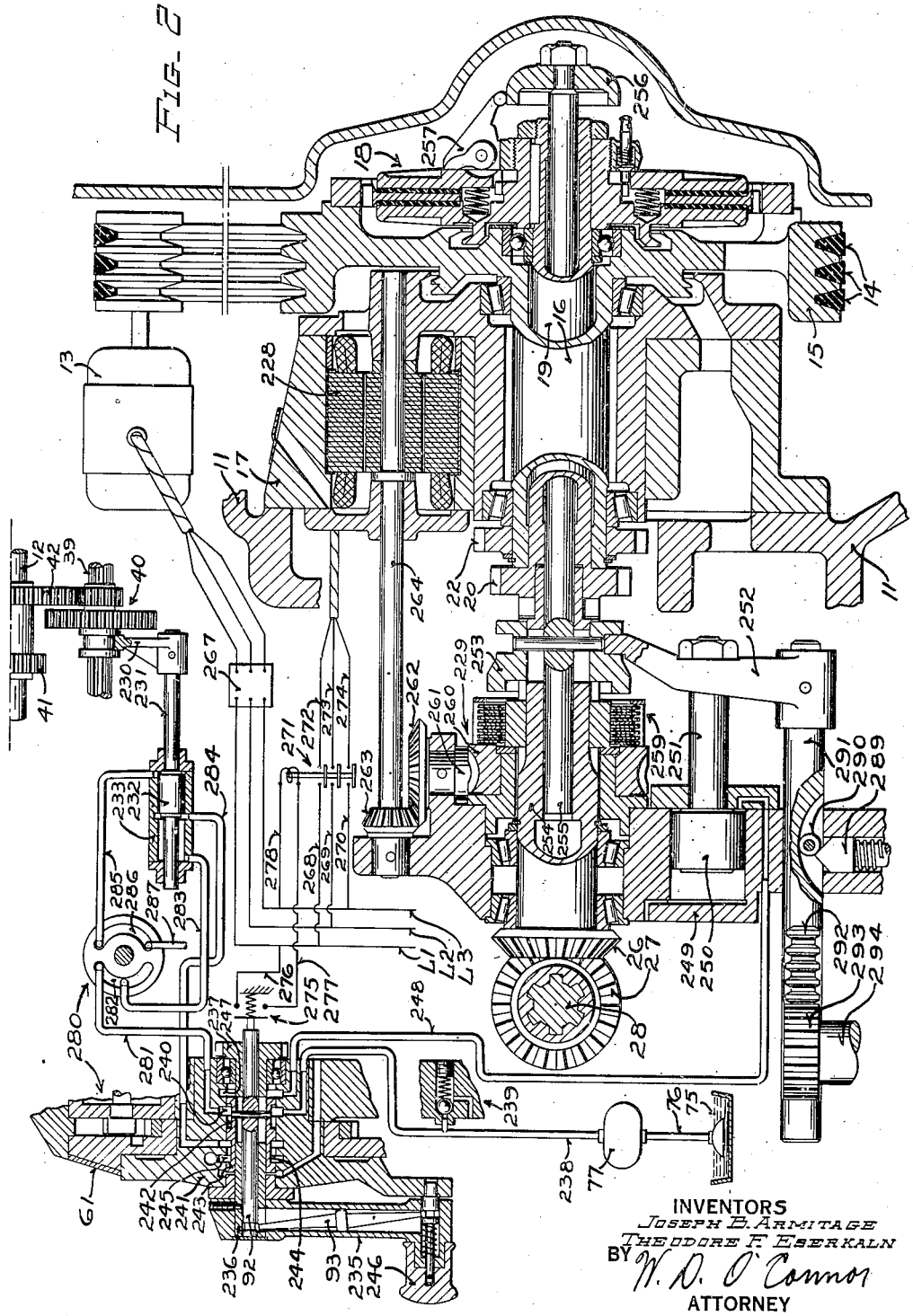

March 28, 1944.  J. B. ARMITAGE ET AL  2,345,171
MACHINE TOOL TRANSMISSION AND CONTROL MECHANISM
Filed Feb. 11, 1939  6 Sheets-Sheet 3
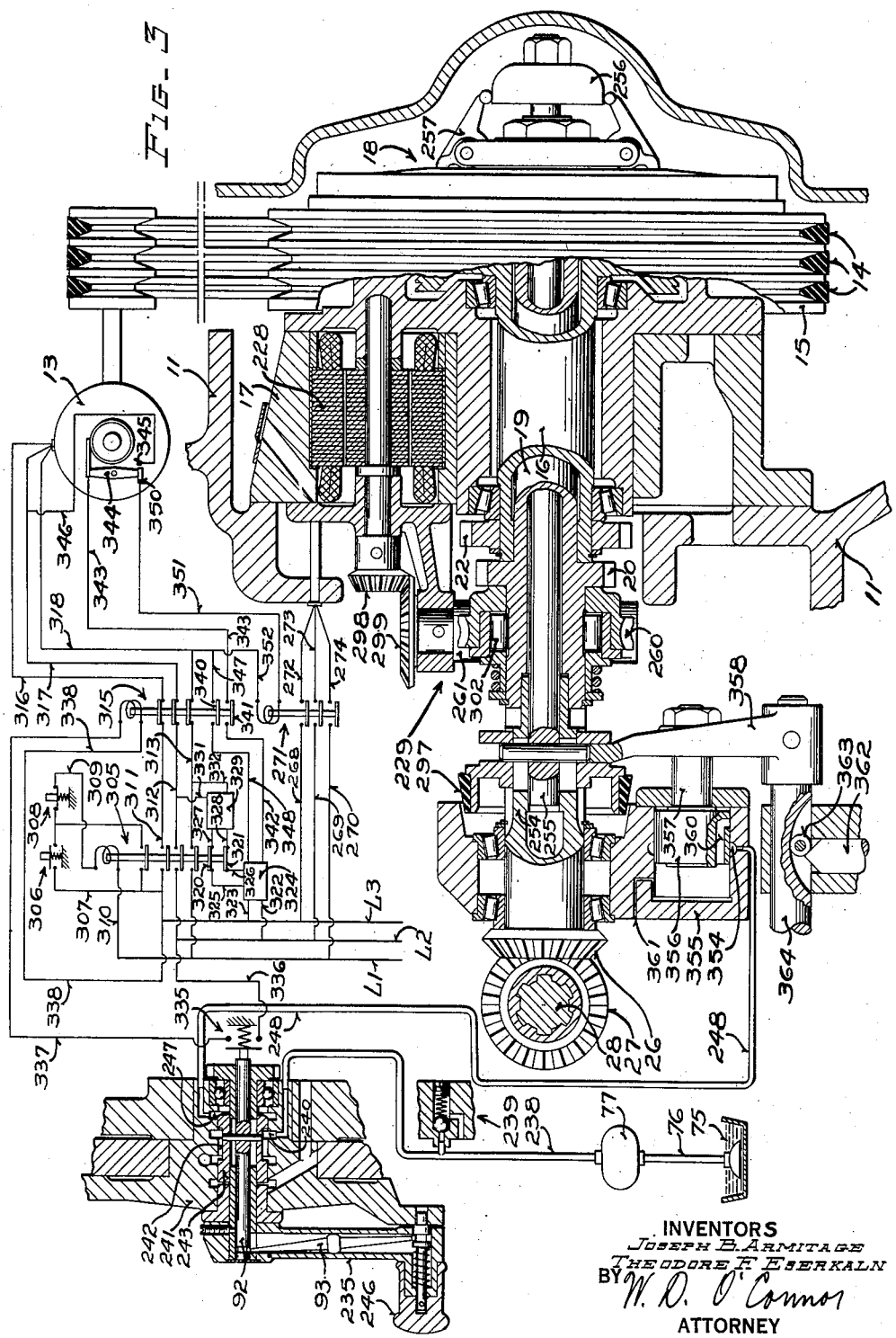
INVENTORS
Joseph B. Armitage
Theodore F. Eserkaln
BY W. D. O'Connor
ATTORNEY March 28, 1944.  J. B. ARMITAGE ET AL  2,345,171
MACHINE TOOL TRANSMISSION AND CONTROL MECHANISM
Filed Feb. 11, 1939  6 Sheets-Sheet 4
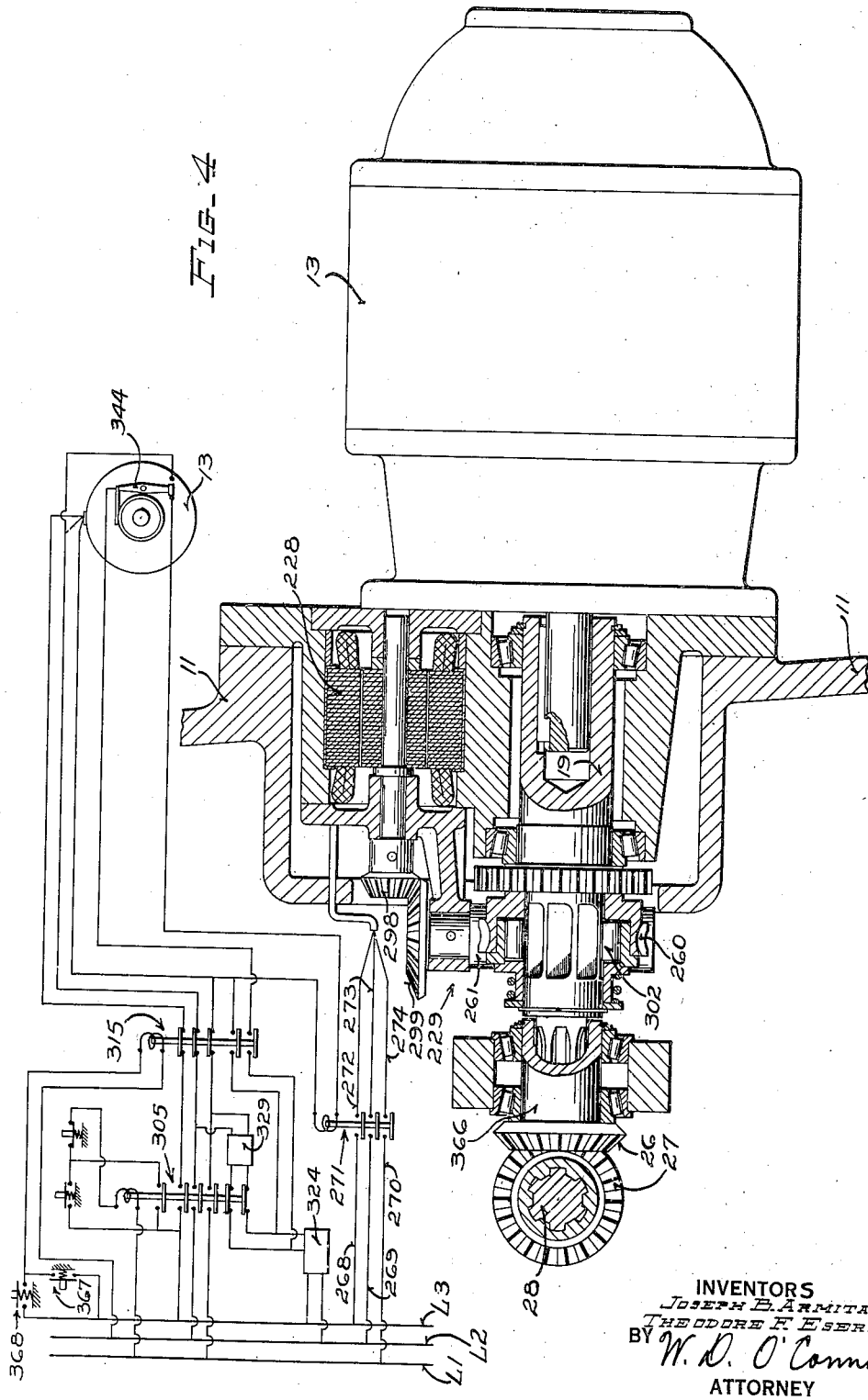
INVENTORS
JOSEPH B. ARMITAGE
THEODORE F. ESERKALN
BY W. D. O'Connor
ATTORNEY

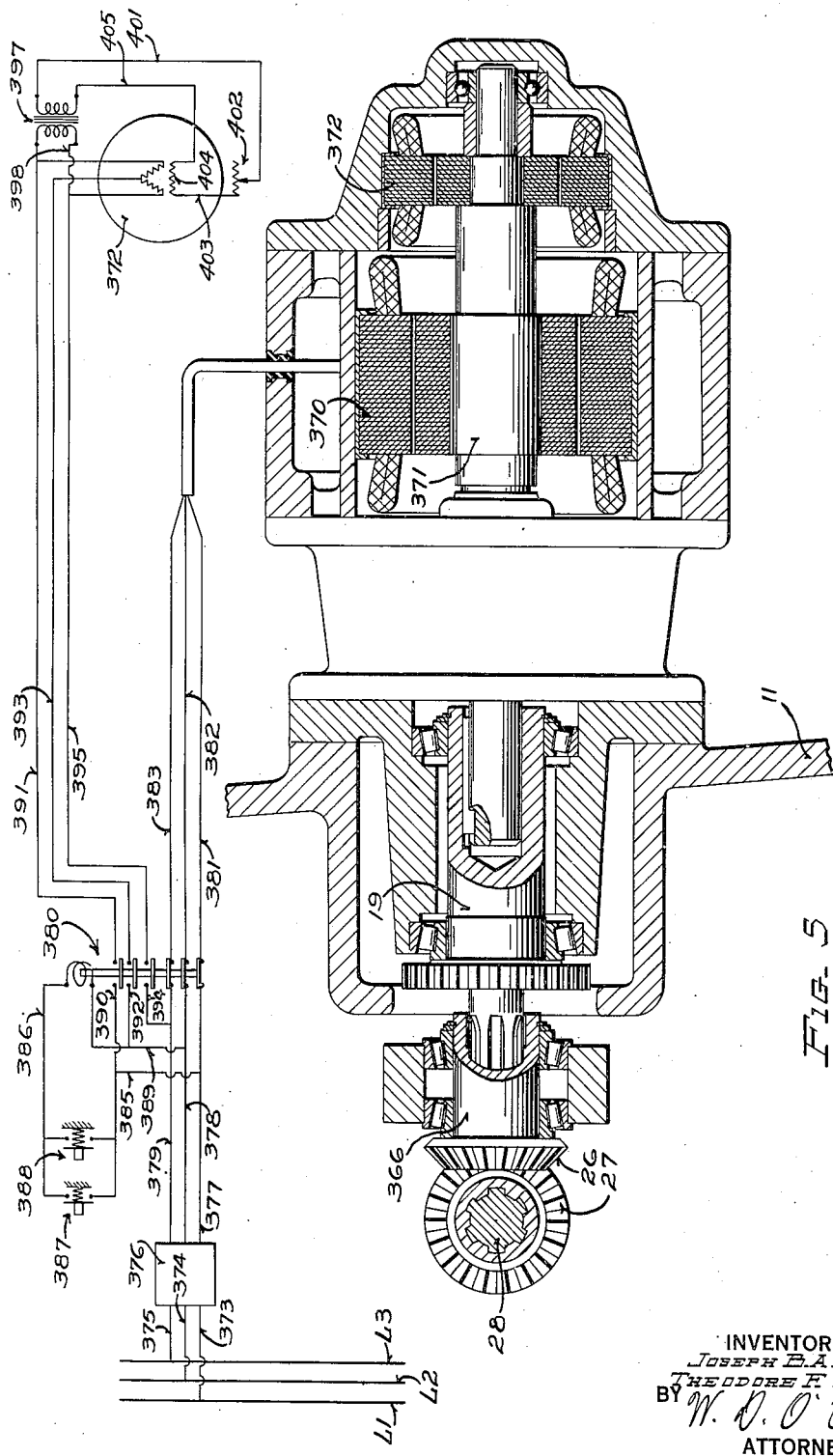

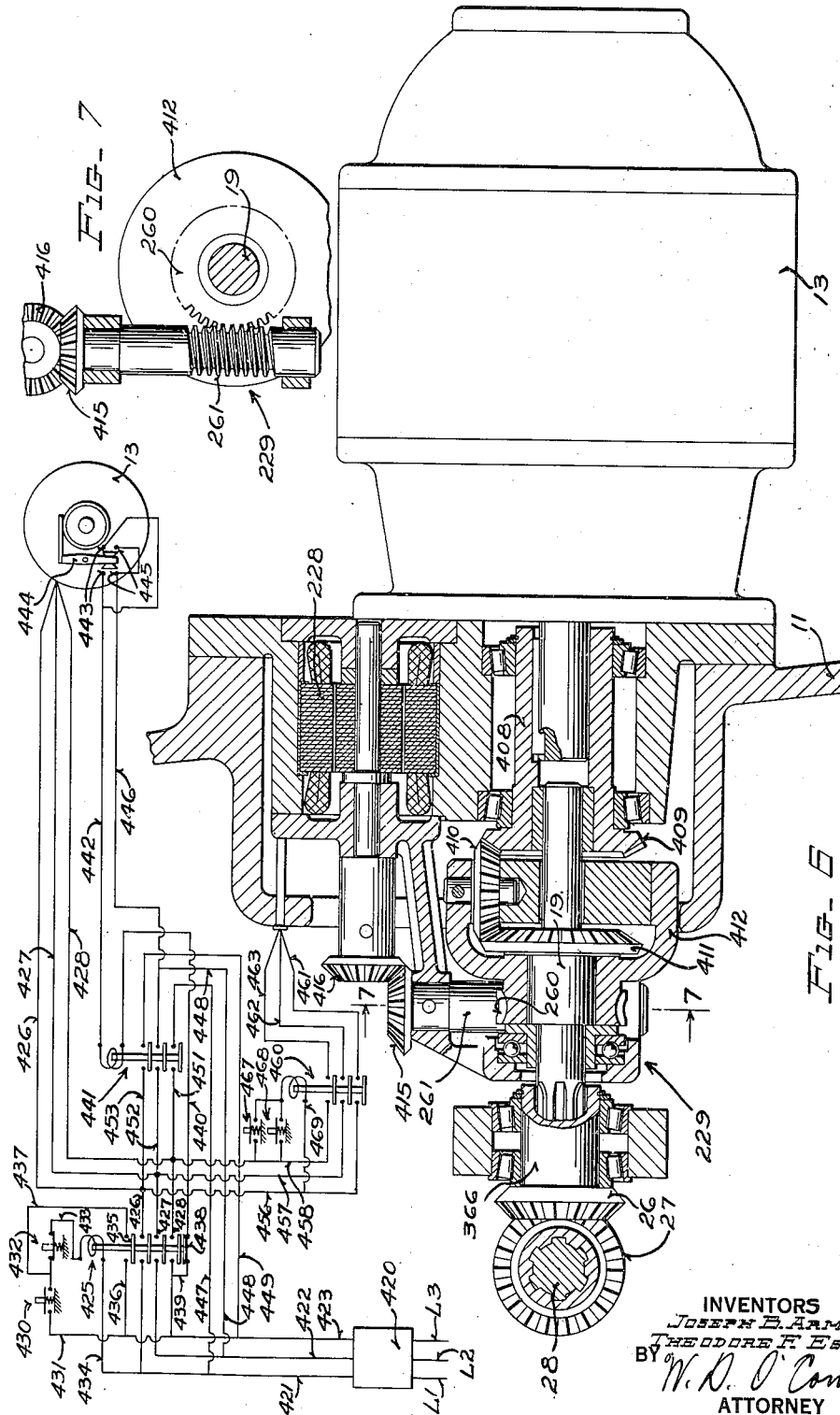

Patented Mar. 28, 1944

2,345,171

UNITED STATES PATENT OFFICE 2,345,171

MACHINE TOOL TRANSMISSION AND CONTROL MECHANISM

Joseph B. Armitage and Theodore F. Eserkaln, Wauwatosa, Wis., assignors to Kearney & Trecker Corporation, West Allis, Wis., a corporation of Wisconsin Application February 11, 1939, Serial No. 255,848

42 Claims. (Cl. 90—18)

This invention relates, generally, to improvements in machine tools, and more particularly to improved control apparatus for adjusting the power transmitting mechanism of a machine tool.

A general object of this invention is to provide an improved transmission and control mechanism for a machine tool;

Another object of the invention is to provide improved control apparatus for regulating the operation of actuating mechanism in a machine tool;

Another object of the invention is to provide improved speed changing apparatus especially adapted for use in a machine tool;

Another object is to provide improved control means for effecting adjustment of a speed changing transmission mechanism;

Another object is to provide an improved power actuated speed changing mechanism for a machine tool;

Another object is to provide improved means for facilitating adjustment of a speed changing transmission mechanism;

Another object is to provide improved means for facilitating gear shifting;

Another object is to provide improved auxiliary driving apparatus for turning a speed changing transmission mechanism slowly while it is being adjusted;

Another object is to provide speed changing control mechanism for a machine tool adapted to effect gear shifting operations expeditiously regardless of whether or not the speed changing mechanism is running prior to the shifting movement;

Another object is to provide speed changing control mechanism for a machine tool that is operative to effect a shifting movement regardless of the condition of operation of the machine and that functions to re-establish the previous condition of operation after the shifting movement has been completed;

Another object is to provide, in a machine tool having a plurality of speed adjusting devices, control means responsive to an adjusting movement of any one of the devices and operative to turn the speed changing mechanism slowly during adjustment thereof;

Another object is to provide in a machine tool having a plurality of gear shifting levers, control means responsive to a shifting movement of any one of the levers for effecting slow speed operation of the speed changing mechanism to facilitate gear shifting;

Another object is to provide improved speed changing control means adapted to check the speed of operation of a speed changing mechanism rapidly prerequisite to its adjustment and then to turn it slowly while it is being adjusted;

Another object is to provide an improved machine tool driving mechanism including a brake for stopping rotation of the speed changing mechanism together with means for turning the brake slowly for moving the mechanism in manner to facilitate its adjustment;

Another object is to provide, in a machine tool transmission mechanism having a braking member, control means including an irreversible drive mechanism arranged to resist the braking torque and operative to turn the braking member slowly to condition the transmission mechanism for gear shifting;

Another object is to provide an electrical control system for a machine tool speed changing mechanism arranged to function prerequisite to a speed adjusting operation to effect slow turning movement of the mechanism for facilitating its adjustment;

A further object is to provide an improved control system for conditioning the driving action of power means upon a speed changing transmission mechanism prerequisite to a speed adjusting operation;

A still further object is to provide a machine tool transmission mechanism including a speed changing apparatus driven by means of a differential mechanism, together with an auxiliary power source arranged to act selectively upon the differential mechanism in manner to largely neutralize the driving effect thereof for reducing the speed of the mechanism to that adapted to facilitate its adjustment.

According to this invention, speed changing adjustments of a machine tool transmission mechanism are effected expeditiously by improved control apparatus including an auxiliary power source for turning the transmission mechanism slowly to facilitate the speed changing operation. The speed changing transmission mechanism may include shiftable gearing and clutches adjustable either manually or by power in response to movement of one or more levers, the arrangement being such that upon movement of any one of a plurality of speed selecting levers, the main driving means is rendered inoperative and the slow speed driving means is brought into operation automatically prerequisite to a speed changing operation. The automatic slow speed driving action may occur in response to an unlatching movement of a speed adjusting lever, the control being effected preferably by improved hydraulically and electrically actuated power means. The auxiliary slow speed driving power source may be a gear reduction train or an independent electric motor and it may conveniently be connected to drive the speed changing mechanism by means of a friction clutch which functions also as a brake to reduce the speed of the mechanism, or the drive may be effected by means of an overrunning clutch, a separate braking arrangement being provided in the latter case. When the main power source and the auxiliary power source are constituted by separate electric motors, the braking action may be effected upon the main motor electrically, the auxiliary motor being started automatically after the main motor has stopped. As a modification, the auxiliary motor may be of the slow speed type preferably connected directly to the transmission mechanism and running idle when the main motor is operating. In this case the auxiliary motor may conveniently be incorporated in the structure of the main driving motor. According to another modification, the main motor is connected to drive the transmission mechanism by means of a differential device or the like which may be acted upon by the auxiliary motor, while the main motor continues running, in manner to largely neutralize the driving effect of the main motor thereby reducing the speed of the mechanism to that adapted to facilitate adjustment.

The foregoing and other objects of this invention, which will become more fully apparent from the following detailed specification, may be achieved by the particular apparatus constituting exemplifying embodiments of the invention that is illustrated in and described in connection with the accompanying drawings, in which:

Figure 1 is a fragmentary, partly diagrammatic view, largely in vertical section, of a machine tool transmission and control mechanism constituting an illustrative embodiment of the present invention;

Fig. 2 is a fragmentary, partly diagrammatic view, generally similar to Fig. 1, but showing another embodiment of the invention;

Fig. 3 is a fragmentary, partly diagrammatic view, generally similar to Fig. 2, showing still another embodiment of the invention;

Fig. 4 is a fragmentary, partly diagrammatic view, of a machine tool driving and control unit embodying another modification of the invention;

Fig. 5 is a fragmentary, partly diagrammatic view, generally similar to Fig. 4, showing another modification of the invention;

Fig. 6 is another fragmentary, partly diagrammatic view, generally similar to Figs. 4 and 5, showing a further modification of the invention; and Fig. 7 is a fragmentary detail view of the worm gear speed reducing mechanism shown in Figs. 2, 3, 4 and 6, taken partly in transverse section generally along the plane represented by the line 7—7 in Fig. 6.

The particular transmission and control mechanisms shown in the drawings by way of illustration, are adapted to constitute driving apparatus for actuating movable machine elements at selected predetermined speeds, in accordance with the principles of this invention, the mechanisms being particularly appropriate for embodiment in any of various machine tool structures such as milling machines, lathes or other generally similar machines, in which it may be desired to effect speed changes expeditiously.

Referring more specifically to the drawings, and particularly to Fig. 1 thereof, the speed changing mechanism there shown somewhat diagrammatically as a practical embodiment of the invention, constitutes the spindle speed adjusting mechanism of a milling machine. As a specific example, the particular milling machine to which the invention is here applied, may be of the knee and column type, such as the machine described and shown in its entirety in copending application Serial Number 350,666, filed August 3, 1940, although it it to be understood that this embodiment of the invention may be incorporated in other machines with equal advantage. In the structure shown, the supporting elements 11 represent fragments of the side walls of the usual hollow column structure constituting the frame of the milling machine and serving as a housing for the transmission mechanism, a tool carrying spindle 12 being supported thereby for rotation by the transmission mechanism selectively at any one of a plurality of predetermined speeds.

Power for rotating the spindle 12 and for effecting movements of other elements of the machine, is derived from a main power source represented by an electric motor 13 such as is ordinarily housed within the base of the hollow frame or column 11. The motor 13 is connected by multiple belts 14 to a main driving pulley 15 carried on a hollow sleeve 16 which is rotatably mounted in a pulley bracket 17 secured to one side of the frame 11. The pulley 15 may be selectively connected by means of a disc friction clutch 18, to a hollow main drive shaft 19 that extends into the column 11 through the hollow sleeve 16.

To provide for driving the work supporting elements of the milling machine at feed rate, the inner end of the shaft 19 is fitted with a spur gear 20 that turns only when the clutch 18 is engaged and that meshes with a gear 21 of a train connected to effect movement of the work support. For moving the work support at rapid traverse rate, the inner end of the sleeve 16 is provided with a similar spur gear 22 which rotates whenever the pulley 15 is turning regardless of whether or not the clutch 18 is engaged, and serves to actuate another work support moving train. The main driving shaft 19 is operatively connected to an axially aligned hollow stub shaft 23 by a coupling 24. The stub shaft 23 carries a brake 25 and is provided at its inner end with a bevel pinion 26 that meshes with a pair of similar bevel pinions 27 (only one of which is shown) rotatably mounted on a transverse shaft 28. The pinions 27 are arranged to be connected alternatively to the shaft 28 by means of a slidable clutch spool 29 that may be moved selectively by a reversing control mechanism 31, in manner to effect operation of the shaft 28 in either direction.

The shaft 28 is connected by meshing spur gears 32 and 33 to drive a parallel shaft 34 constituting part of a first speed changing mechanism and carrying slidable gear couplets 35 that may be meshed selectively with complementary gears 36 fixed on a parallel intermediate shaft 37. Some of the gears 36 are, in turn, arranged to be meshed selectively by a gear couplet 38 slidably mounted on a parallel splined shaft 39 constituting another part of the first speed changing mechanism, the various gear couplets being arranged in well known manner to be shifted selectively to effect various gear combinations for driving the shaft 39 at any one of a plurality of speeds.

The splined shaft 39 also carries another, relatively large gear couplet 40 which is slidably mounted thereon for selective engagement with range change gears 41 and 42 fixed on the tool spindle 12. The couplet 40 and gears 41 and 42 constitute a second speed changing mechanism or range changer arranged in series relationship with the first speed changer and adjustable to effect operation of the spindle 12 in either a high speed range or a low speed range. The range change shiftable couplet 40 may be moved to either of its two positions by means of a shifting fork 43 which engages a groove 44 in the couplet and is slidably mounted on a guide rod 45 for movement parallel with the shaft 39. For moving the shifting fork 43, there is provided a range changing control lever or crank 46 that is fixed on the outer end of a control shaft 47 connected at its inner end by gearing 48 to a stub shaft 49 that is provided with a crank arm 50 the end of which engages a slot 51 in the shifting fork 43. As shown, the control shaft 47 extends through and is journalled in a control bracket or speed box 52 that is mounted in the side of the column 11 and which also rotatably supports the stub shaft 49. The lever 46 is arranged to be moved to and latched in either of two operating positions corresponding respectively with the high speed range position and the low speed range position of the range changer couplet 40.

The couplets 35 and 38 of the first speed changing mechanism are likewise provided with similar shifting forks 53 and 54 respectively, both of which are operatively connected to be moved in predetermined sequence by turning a single speed changing lever or crank 55. As shown, the speed changing lever 55 is fixed on the outer end of a control shaft 56 which also extends through and is journalled in the bracket 52 in the side of the column. The shaft 56 is provided at its inner end with a control pinion 57 that is arranged to actuate a plurality of cam discs or plates 58 and 59 interconnected by intermittent gearing and which function to actuate the shifting forks 53 and 54 respectively. By this arrangement, the speed at which the intermediate shaft 39 may be driven is determined by the position of the cams 58 and 59 resulting from turning the speed changing lever 55 through one or more complete revolutions. A speed indicating dial 61 is operatively connected by reduction gearing to be turned by the cam disc 58 and is provided with indicia arranged to be read in conjunction with the position of the range changing lever 46, to determine the speed at which the spindle 12 will be driven for any particular adjustment of the speed changing mechanism and the range changer.

To facilitate the speed changing operation, apparatus is provided for turning the entire transmission mechanism slowly while the gearing is being shifted, in accordance with the principles of the invention fully set forth and broadly claimed in Patent No. 2,110,173, issued March 8, 1938, and reissued April 23, 1940, as Re. 21,434 to Walter M. Pohl and Joseph B. Armitage and entitled Machine tool transmission and control. The particular auxiliary slow speed driving mechanism shown in Fig. 1 of the drawings is generally similar to that disclosed in the co-pending application of Joseph B. Armitage, Serial No. 146,581, filed June 5, 1937 and entitled Machine tool structure and control mechanism which issued May 6, 1941, as Patent No. 2,240,973.

As appears in the drawings, power for effecting the slow speed turning movement of the transmission mechanism is derived from the rapid traverse spur gear 22 on the inner end of the continuously rotating pulley sleeve 16, the gear 22 being meshed with an idler gear 62 through which motion is transmitted to a speed reducer driving gear 63. As shown, the gear 63 is provided with an eccentrically positioned journal 64 formed on an extended hub or sleeve portion and which carries a rotatably mounted planetary gear couplet 65, the arrangement being such that the couplet is gyrated or revolved bodily in a circular path when the gear 63 is rotated. One element of the planetary gear couplet 65 meshes with and rolls within a stationary internal or ring gear 66 which is fixed on the pulley bracket 17 and the other element of the couplet 65 meshes with and rolls within a rotatably mounted internal gear 67. The ratio of the number of teeth on the two elements of the couplet 65 to the number of teeth in the ring gears 66 and 67 is such that when the gear 63 is rotated for gyrating the couplet 65 within the ring gears, a differential action occurs which causes the rotatably mounted ring gear 67 to progress slowly relative to the stationary ring gear 66.

As shown in the drawing, the rotatable ring gear 67 is splined on a shaft 68 that carries one element of an auxiliary friction clutch 69, the other element of which is carried by a spur gear 70. The spur gear 70 meshes with the gear 21 of the feed rate train which in turn meshes with the spur gear 20 on the main driving shaft 19, the arrangement being such that when the main clutch 18 is disengaged and the auxiliary clutch 69 is engaged, the slow speed driving mechanism will turn the gear 21 slowly thereby turning the connecting coupling 24 and the speed changing mechanisms at the slow rate adapted to facilitate the gear changing operation.

For effecting automatic disengagement of the main clutch 18 and subsequent engagement of the auxiliary clutch 69 prerequisite to a speed changing operation, a hydraulic control system is provided in association with the gear shifting mechanism, the arrangement being such that the system responds to movement of either the range changing lever 46 or the sped changing lever 55. As shown, the levers 46 and 55 are provided respectively with spring pressed latching plungers 73 and 74 which normally engage latching holes in stationary parts of the machine to retain the levers in adjusted position in well known manner, the arrangement being such that upon movement of either the latching plunger 73 or the latching plunger 74 to unlatched position, the control system will respond automatically, functioning to disengage the main clutch and engage the auxiliary clutch thereby conditioning the apparatus for a subsequent speed changing operation.

The pressure fluid for actuating the hydraulic control system may be the lubricating oil that collects in a sump 75 in the lower part of the column 11 from which it is withdrawn through a conduit 76 by means of a pump 77 that is preferably a continuously driven gear pump of the usual type for providing lubricating oil under pressure to the machine. From the pump 77, the oil is forced under pressure into a conduit 78 to which is connected an adjustable relief valve 79 that functions to relieve excessive pressure which may develop within the hydraulic system during a speed changing operation. The conduit 78 leads to a port 80 in a valve casing 81 that is disposed concentric with the control shaft 47 carrying the control range change lever 46. The pressure port 80 communicates at all times with a groove 82 in a valve plunger 83 which is slidably mounted on the shaft 47 for axial movement by means of the latching plunger 73. With the lever 46 latched in adjusted position, as shown, the groove 82 communicates with a port 84 in the valve casing 81 which is connected by a conduit 85 to a port 86 in a valve casing 87 that is arranged concentric with the control shaft 56 carrying the speed changing lever 55. The pressure port 86 communicates at all times with a groove 88 in a valve plunger 89 which is slidably mounted on the shaft 56 for axial movement by means of the latching plunger 74. With the lever 55 latched in adjusted position as shown, the groove 88 communicates with a port 90 in the casing 87 through which the oil normally escapes at low pressure, flowing thence through other elements of the control system and finally into the lubricating system of the machine.

As shown in the drawings, the valve plungers 83 and 89 are each connected by a transverse pin 91 to a central actuating rod 92 that is slidably mounted within the corresponding control shaft and that is provided at its outer end with a circumferential groove. The groove in the rod 92 is engaged by one end of a lever 93 which is pivotally mounted within the hollow handle of the speed changing crank and that engages with its other end a groove in the corresponding latching plunger, the arrangement being such that when either latching plunger is withdrawn from its cooperating latching hole, the lever 93 is pivoted in manner to move the control rod 92 and the corresponding valve plunger inwardly toward the right, as seen in the drawings.

If it is desired to effect a change in speed by means of the speed changing lever 55 when the machine is operating with the main clutch 18 in engagement and the oil from the pump 77 flowing at low pressure through the port 90 into the lubricating system, it is first necessary to withdraw the latching plunger 74. In moving the latching plunger to the unlatched position prerequisite to effecting a speed changing movement of the lever 55, the valve plunger 89 is caused to move to the right by means of the pivoted lever 93 and control rod 92, in the manner previously described. This results in moving the groove 88 out of communication with the port 90 and into communication with a port 94 from which a conduit leads to clutch actuating mechanism that functions to disengage the main clutch 18 and the brake 25 and to engage the auxiliary slow speed driving clutch 69.

To effect a range changing operation by means of the range changing lever 46, the latching plunger 73 is first withdrawn from the cooperating latching hole thereby moving the valve plunger 83 to the right. This causes the groove 82 to be moved out of communication with the port 84 that leads to the lubricating system, and into communication with a port 96. As shown, the port 96 is connected by means of a conduit 97 to a port 98 in the valve casing 87 associated with the lever 55. With the lever 55 in the latched position, the port 98 communicates through a groove 99 in the valve plunger 89 with the port 94, thereby establishing a pressure connection with the conduit which leads to the clutch actuating apparatus.

Accordingly, whenever either the latching plunger 73 or the latching plunger 74 is moved to unlatched position prerequisite to a shifting operation, the pressure fluid supply from the pump 77 is disconnected from the port 90 through which the oil had previously passed at low pressure to the lubricating system and is connected to the port 94, the full pressure from the pump 77, as determined by the setting of the relief valve 79, then being exerted through the port 94 into a conduit 101 that leads to the right end of a relay valve 102. Pressure from the conduit 101 then causes a valve plunger 103 in the right end of the relay valve 102 to be moved to the left, the fluid in the left end of the valve being exhausted through a conduit 104 that leads back to the port 90 in the valve casing 87. If the shifting operation is being effected by the lever 55, the exhaust fluid escapes from the port 90 past the left end of the valve plunger 89 into an exhaust or leakage port 105. If the shifting operation is being effected by the lever 46 the exhaust fluid passes from the port 90 through the groove 88, into the port 86 and thence by the conduit 85 to the groove 84 from which it escapes past the left end of the plunger 83 into an exhaust or leakage port 106. With the relay valve plunger 103 in the left position, a port 111 is uncovered permitting the pressure fluid from the conduit 101 to flow through it into a conduit 112 which communicates with an elongated port 113 at the mid-portion of a clutch and brake actuating cylinder 114.

As shown, the cylinder 114 is provided with a piston 115 having a piston rod 116 that is slotted to engage one end of a pivoted control arm 117 fixed on a rocking shaft 118. The shaft 118 also carries an arm 119 which engages a grooved shifting collar 120 that is slidably mounted on the hollow driving shaft 23. The shifting collar 120 is connected by a transverse pin 121 extending through a slot in the shaft 23, with a control rod 122 that extends longitudinally through the aligned hollow shafts 23 and 19 in manner to project beyond the driving pulley 15. At its outer end, the control rod 122 is provided with a head or disc 123 that is connected by means of a plurality of toggle links 124 with corresponding clutch actuating fingers 125, the arrangement being such that when the rod 122 is moved to the right, to the position shown in the drawing, the toggle links 124 move the clutch fingers 125 in manner to engage the main driving clutch 18, the piston 115 then being positioned at the left end of the cylinder 114, as shown. When the piston 115 moves to the right end of the cylinder, the control rod 122 is moved to the left and the toggle formed by the links 124 and the head 123 is broken, thereby permitting the clutch 18 to be moved to disengaged position by a plurality of compression springs 126. This results in disconnecting the driving pulley 15 and the main driving motor 13 from the driving shaft 19. As the shifting collar 120 moves to its extreme left position after the clutch has been disengaged, it abuts against and engages the brake 25 to stop rotation of the transmission mechanism and the spindle 12. Movement of the control rod 122 into either the clutch engaging or the brake engaging position is assisted by means of a detent mechanism comprising a detent roller 127 carried by the piston rod 116 and that is engaged by a spring urged plunger 128 in manner to urge the actuating mechanism into either of its two extreme positions and thereafter to retain it in the engaged position.

When pressure is applied to the elongated port 113 in the cylinder 114 prerequisite to a gear shifting operation, the pressure fluid enters a circumferential groove 133 in the piston 115 and flows from it through a radial port 134 into a longitudinal passageway 135 extending from end to end of the piston. As shown, the passageway 135 constitutes part of a valve device, it being fitted with a cooperating valve plunger 136 the stem of which extends in each direction and is secured to the respective ends of the cylinder 114 by threaded nuts 137, the arrangement being such that the position of the plunger 136 may be adjusted longitudinally. With the parts in the position shown, the pressure fluid flows through the longitudinal passageway 135 into the left end of the cylinder 114, thereby forcing the piston 115 to the right, the fluid in the right end of the cylinder being forced out through an exhaust port 140 into an exhaust conduit 141. The exhaust conduit 141 leads to a port 142 in the relay valve 102 which is connected by a groove 143 in the valve plunger 103 (the plunger being in the left position) to an exhaust port 144 that is open to the atmosphere.

The piston 115 in moving to the right, overcomes the force exerted by the detent plunger 128, and continues its movement until it arrives at a centralized position in which the valve plunger 136 closes the radial port 134 and prevents the entrance of further pressure fluid into the cylinder. In this position the piston 115 partially closes the exhaust port 140 and partially opens another exhaust port 146 at the left end of the cylinder which also discharges into the exhaust conduit 141, the arrangement being such that if the piston is moved farther to the right by the detent plunger 128 as the roller 127 passes over the point of the plunger at the mid-position fluid will be trapped in the right end of the cylinder to prevent continued movement of the piston. With the piston 115 in the mid-position, the control rod 122 is in a central or neutral position in which the main clutch 18 is disengaged and likewise the brake 25 is disengaged, the transmission mechanism being thereby disconnected from the main driving shaft 19 and free to be turned by the auxiliary slow speed driving mechanism to facilitate gear shifting.

Since the slow speed auxiliary driving mechanism should not be engaged unless both the main clutch 18 and the brake 25 are disengaged, a hydraulic control circuit for actuating the auxiliary clutch 69 is arranged to become effective only after the clutch actuating piston 115 has arrived at the central or neutral position. For this purpose, the cylinder 114 is provided at its midportion with a port 148 that is arranged to receive pressure fluid from the circumferential groove 133 when the piston 115 is in the mid-position. From the port 148, the pressure fluid flows through a conduit 149 which leads to an auxiliary clutch actuating cylinder 150 formed in the pulley bracket 17, the pressure fluid within the cylinder 150 exerting force upon a piston 151 therein to move it to the left. The piston 151 acts upon one end of a pivoted lever 152 the other end of which engages a plate 153 which contacts the auxiliary clutch 69, the arrangement being such that the force of the pressure fluid is transmitted from the piston 151 to the clutch in manner to move it into engaged position. After engaging the clutch 69, the excess fluid in the control system escapes through the adjustable relief valve 79, the valve maintaining a predetermined pressure in the system sufficient to hold the clutches in the slow speed driving position. Either of the speed selecting levers 46 and 55 may then be moved as may be necessary to effect the desired speed changing operation, the gearing being rotated meanwhile at the slow speed for facilitating meshing of the various shiftable elements. Although both of the control levers 46 and 55 are shown mounted in the control bracket 52, it is to be understood that they are not necessarily mounted close together but may be mounted at widely separated positions on the machine.

After the speed changing operation has been completed, both of the latching plungers 73 and 74 are returned to the latching position shown in the drawing, thereby discontinuing the neutralizing action by disconnecting the pressure pump 77 from the conduit 101 leading to the right end of the relay valve 102. Fluid in the right end of the relay valve 102 is then permitted to escape back through the conduit 101, the groove 99 in the valve plunger 89, and the conduit 97 to the port 96 in the valve casing 81 which is then open to the atmosphere past the right end of the valve plunger 83. At the same time, the pressure fluid in the auxiliary clutch actuating cylinder 150 escapes through a bleeder hole 154 in the piston 151, thereby permitting a compression spring 155 in the shaft 68 to move the plate 153 to the left in manner to disengage the auxiliary clutch 69. With the latching plungers 73 and 74 in latched position, the leakage ports 105 and 106 in the lever actuated valves are closed and the fluid pressure circuit is re-established from the pump 77 through the conduit 78, the port 80, the valve groove 82, the port 84, conduit 85, port 86, groove 88, port 90, and conduit 104 to the left end of the relay valve 102. This causes the valve plunger 103 to be moved to the right to the position shown, thereby closing the port 111 and preventing pressure fluid from flowing through it into the conduit 112 leading to the clutch actuating cylinder 114. Likewise the port 142 in the relay valve is closed thereby preventing the escape of pressure fluid from the cylinder 114 through either the exhaust port 140 or 146 and the exhaust conduit 141.

When the valve plunger 103 moves to the right within the relay valve 102, it uncovers a port 158 and admits pressure fluid into it from the conduit 104. From the port 158 the pressure fluid flows through a conduit 159 to a port 160 in a valve casing 161 constituting part of a manually actuated remote control valve for selectively engaging or disengaging the main clutch and brake by hydraulic power. The port 160 communicates with a groove 162 in a cooperating valve plunger 163 which, in the position shown, communicates with a port 164 connected by a conduit 165 to the right end of the clutch actuating cylinder 114. The pressure fluid flowing into the right end of the cylinder 114 moves the piston 115 to the left, with the assistance of the detent plunger 128, to the position shown, thereby re-engaging the main clutch 18 and re-establishing operation of the machine with the spindle 12 turning in the newly selected speed.

Fluid in the left end of the cylinder 114 escapes through an exhaust conduit 166 leading to a port 167 in the valve casing 161 that registers with a narrow groove 168 in the plunger 163. A longitudinal passageway 169 through the plunger 163 establishes communication from the groove 168 to a groove 170 at the right end of the plunger 163. The groove 170 registers with a port 171 in the casing 161 from which the exhaust fluid flows through a conduit 172 to a port 173 in the relay valve 102 which is then connected by the groove 143 with the exhaust port 144. When the piston 115 arrives at the left end of the cylinder 114, it uncovers an exhaust port 175 through which the pressure fluid then flows from the cylinder into a conduit 176 that leads to a port 177 in the control valve casing 161. The port 177 has communication through a groove 178 in the valve plunger 163 with a port 179 through which the fluid escapes at low pressure into a conduit 180 leading to the lubrication system.

The manually actuated valve plunger 163 is retained in the position shown by means of a spring pressed detent 181 that engages a notch 182 in the plunger. If it is desired to disengage the main clutch 18, to stop the spindle 12 the valve plunger 163 may be moved to the right by means of an actuating knob 183, until the detent 181 enters a second notch 184. With the plunger 163 in the stop position, the pressure port 160 in the valve casing 161 is disconnected from the port 164 and connected to the port 167 by the groove 162. The fluid then flows through the port 167 and the conduit 166 to the left end of the cylinder 114, thereby forcing the piston 115 to the right in manner to disengage the main clutch 18 and to engage the brake 25. Fluid in the right end of the cylinder 114 then escapes through the conduit 165 and the port 164 into a groove 185 in the plunger 163. The groove 185 communicates with the longitudinal passageway 169 through which the exhaust fluid flows into the exhaust conduit 172 leading to the port 173 of the relay valve which is then in communication with the exhaust port 144. When the piston 115 arrives at the right end of the cylinder 114, it uncovers another exhaust port 186 which also communicates with the exhaust conduit 176 thereby permitting the fluid to flow from the left end of the cylinder through the port 186, the conduit 176, the port 177, the groove 178, and the port 179, into the lubrication conduit 180, the detent plunger 128 then serving to retain the brake 25 in light engagement.

In order that the spindle 12 may be stopped instantaneously in an emergency, arrangements are made to apply the brake firmly, the plunger 163 being arranged to be moved farther to the right for this purpose by pushing inward on the knob 183 against the action of the detent 181. This causes the groove 178 in the plunger to be moved out of communication with the port 177 thereby preventing the escape of fluid to the lubricating system, whereupon the full pressure of the fluid will be applied to the left end of the piston 115 in manner to engage the brake 25 with sufficient force to stop the mechanism quickly.

If it is desired to effect a speed changing operation at a time when the manually actuated valve piston 163 is in the stop position and the main clutch 18 is disengaged, unlatching movement of either the latching plunger 73 or the latching plunger 74 will cause the piston 115 to be moved to the neutral position and the slow speed drive clutch 69 to be engaged, as previously explained. When the latching plungers are re-engaged with their latching holes, the pressure fluid connection will be re-established through the manual control valve to exert pressure upon the left end of the piston 115 to move it from the neutral position back to the brake engaging position, thereby re-establishing the condition that existed prior to the shifting movement.

According to the present invention, the reduction gear auxiliary slow speed driving mechanism shown in Fig. 1 may be replaced by an independent auxiliary source of power such as a small electrically or hydraulically actuated motor which need have only sufficient power capacity to turn the speed changing mechanism slowly during shifting of the gearing. In applying this arrangement to the structure shown in Fig. 1, the auxiliary motor might well be connected to drive the planetary speed reduction mechanism independently of the main motor, and suitable control mechanism could be provided for starting the auxiliary motor prerequisite to a shifting operation, in the manner set forth in the following description in connection with Figs. 2 to 6.

In the structure shown in Fig. 2, the main or primarily driving motor and the main clutch and brake system for operating the machine are shown as being generally similar to the corresponding elements disclosed in Fig. 1. However, the auxiliary power source for the slow speed movement is in this instance constituted by an independent small auxiliary or secondary electric motor 228 that is mounted in the pulley bracket 17 and is operatively connected by means of a self-locking or irreversible gear mechanism 229 to turn the normally stationary element of the spindle brake at slow speed in order to rotate the transmission mechanism slowly during a speed changing operation. The speed changing mechanism with which the driving apparatus shown in Fig. 2 is normally associated, is represented as being generally similar to the spindle actuating train shown in the previously mentioned Patent No. 2,240,973, although it could as well be applied to the mechanism shown in Fig. 1. The spindle train is here represented by the range change shiftable couplet 40 and the range gears 41 and 42 on the tool spindle 12, as shown in Fig. 1, the couplet 40 in this instance being arranged for power shifting. As shown, the couplet 40 is adapted to be moved along the splined shaft 39 by means of a shifting fork 230 carried on a plunger 231 extending from a piston 232 which is slidably fitted in a hydraulic cylinder 233. Control of the shifting movement of the transmission mechanism is in this case effected by a single speed controlling crank or lever 235 fixed on the extending end of a control shaft 236 which carries at its inner end a control pinion 237 that may be operatively connected, as in the case of the pinion 57 shown in Fig. 1, to effect manual actuation of the first part of the speed changing mechanism there shown.

Fluid pressure for shifting the range changer couplet 40 and for automatically controlling the main clutch 18 and the slow speed drive mechanism, is derived from the pump 77 through a conduit 238. The conduit 238 connects with a relief valve 239 and leads to a port 240 in a valve casing 241 disposed concentric with the control shaft 236, the port 240 being at all times in communication with a groove 242 in a valve plunger 243.

The valve plunger 243 is slidably mounted in the valve casing 241 and is provided with another groove 244 which is normally in communication with a port 245 leading to the lubricating system conduit through which the pressure fluid escapes from the hydraulic system after passing through the range changer cylinder 233. Upon initiating a shifting movement, a spring pressed latching plunger 246 on the lever 235, similar to the plungers 73 and 74 shown in Fig. 1, is withdrawn, thereby moving the valve plunger 243 to the right and closing the lubricating port 245, the excess pressure in the system then escaping through the relief valve 239. Movement of the valve plunger 243 to the right also places the groove 242 in communication with a port 247 which is connected by a conduit 248 to the right end of a clutch operating cylinder 249, the fluid pressure in the cylinder 249 then acting upon a piston 250 therein to move it to the left.

As shown, the piston 250 is provided with a piston rod 251 which is connected to a shifting fork 252 that engages a shifting collar 253 slidably mounted on a hollow shaft 254 disposed in axial alignment with and connected to the main driving shaft 19. The collar 253 is operatively connected to a control rod 255 extending axially through the hollow shafts 19 and 254 and carrying at its outer end a bell 256 that engages clutch actuating fingers 257 in such manner that in the position shown, the main clutch 18 is forced into engagement. When the piston 250 and the control rod 255 are moved to the left by the pressure fluid, the main clutch 18 is disengaged and the shifting collar 253 is forced against the plates of a plate type brake 259 the inner part of which is secured to the driving shaft 254. The outer or normally stationary element of the brake 259 is secured to a worm wheel 260 which is rotatably mounted concentric with the drive shaft 254 and constitutes part of the irreversible gear mechanism 229. The worm wheel 260 is engaged in self-locking manner by a cooperating worm 261, as best shown in Fig. 7, the worm being adapted to resist the reaction torque exerted by the brake 259 upon the worm wheel 260, thereby preventing the wheel from turning when the brake is applied to stop rotation of the spindle 12. As previously mentioned, the slow speed driving effect is in this instance obtained by turning the normally stationary element of the brake 259 and with it the drive shaft 254, the brake functioning also as a clutch to connect the worm wheel 260 to the shaft to drive it at slow speed. For this purpose, the worm 261 is provided with a bevel pinion 262 that meshes with a complementary bevel pinion 263 on a shaft 264 to which the auxiliary motor 228 is operatively connected.

Electric energy for actuating the main motor 13 and the auxiliary motor 228 is derived from an electric power circuit including line conductors L1, L2 and L3. As shown, the main motor 13 is connected to the line conductors by means of a motor starting switch 267 which may be of any type appropriate for starting and stopping the main motor. The auxiliary motor 228 is connected to the line conductors L1, L2 and L3 by conductors 268, 269 and 270 respectively leading to a solenoid operated switch 271 from which corresponding conductors 272, 273, and 274 lead to the motor. When the spring pressed latching plunger 246 on the lever 235 is withdrawn, the lever 93 within the control crank handle is pivoted to move the control rod 92 inwardly in manner to engage and close a control switch 275 which completes a circuit from the line conductor L1 through a conductor 276, the closed switch 275 and a conductor 277 to the solenoid of the switch 271 and thence through conductor 278 to the line conductor L3. Upon energization of its solenoid, the switch 271 is moved to closed position thereby closing the circuit for energizing the auxiliary motor 228 and causing it to drive the worm 261 by means of the bevel pinions 263 and 262 in manner to turn the worm wheel 260, the brake 259, and the shaft 254 at slow speed for rotating the transmission gearing during the shifting operation.

When the crank 235 is rotated in effecting a shifting operation, a valve 280 operatively connected with the speed indicating dial 61 is turned, as explained in the previously mentioned Patent No. 2,240,973, to control the shifting of the range change couplet 40. As shown, fluid pressure for shifting the range changer is derived from the pump 77 through the conduit 238 the port 240 and a conduit 281 which is at all times directly connected to the port 240 and leads to the valve 280. With the valve 280 in the position shown, fluid pressure from the conduit 281 flows through a valve groove 282 in the valve body into a conduit 283 which is connected to the left end of the cylinder 233, the pressure forcing the piston 232 to the right as shown. When the piston 232 arrives at the right end of the cylinder 233, it uncovers a port at the middle of the cylinder through which the fluid then escapes into a conduit 284 connected at all times to the other valve groove 244 in the valve plunger 243 that communicates, when the latching plunger is in latched position, with the port 245 leading to the lubricating system. Fluid in the right end of the cylinder 233 is meanwhile forced out through a conduit 285 which is connected by means of a groove 286 in the valve 280 to an exhaust conduit 287. When the valve 280 is moved to its other position, the pressure conduit 281 is connected by the valve groove 286 to the conduit 285 in manner to force the piston 232 to the left, the fluid in the left end of the cylinder then escaping through the conduit 283 and the port 282 to the exhaust conduit 287.

Since the speed changing mechanism is rotated slowly by the auxiliary motor 228 whenever the latching plunger 246 is withdrawn, the shifting of both the manually actuated gear changing mechanism by the control pinion 237 and of the power actuated range changing mechanism is facilitated. Should the range change couplet 40 fail to engage immediately with its cooperating gear 41 or 42 on the spindle 12, by reason of the gear teeth abutting end to end, the full shifting pressure will be maintained on the piston 232 without interfering with further movement of the speed changing crank 235, the gear couplet 40 being turned slowly meanwhile until the gear teeth are in position to permit full engagement, whereupon movement of the piston 232 to the end of the cylinder 233 will take place and communication with the conduit 284 will be effected.

After a shifting operation has been completed, the latching plunger 246 is returned to its latching position, thereby moving the control rod 92 to the left and opening the control switch 275 to stop the auxiliary motor 228. When the motor 228 stops turning, the transmission mechanism and the spindle 12 also stop turning and are held stationary by the brake 259 which then reacts against the stationary worm wheel 260. Movement of the control rod 92 to the left also moves the valve plunger 243 to the position in which the groove 244 therein re-establishes communication with the port 245 leading to the lubricating system conduit, thereby permitting the pressure fluid to flow at low pressure from the cylinder 233 through the conduit 284 and relieving the pump. At the same time the groove 242 moves out of register with the clutch controlling port 247 to disconnect it from the pressure port 240. The port 247 is then opened to atmosphere through the right end of the valve casing 241 thereby permitting escape of fluid pressure from the clutch operating cylinder 249 to condition it for manual engagement of the main clutch 18, the clutch 18 being held in disengaged position and the brake 259 in engaged position by a spring pressed detent plunger 289 that engages a detent roller 290 carried by a control rod 291 secured to the clutch shifting fork 252. As shown, the control rod 291 is provided with rack teeth 292 which are engaged by a pinion 293 on a clutch actuating shaft 294 that is arranged to be turned by the usual manual clutch controlling lever for disengaging the brake 259 and reengaging the main clutch 18 to re-establish operation of the machine at the new speed after a shifting operation has been completed.

It is to be understood that the structure shown in Fig. 2 might, by suitable modification, be arranged in manner to provide speed control by means of a plurality of speed changing levers such as are shown in Fig. 1, and also that the auxiliary motor 228 might be replaced by driving mechanism operating from the constantly rotating pulley sleeve 16 in manner similar to that in which the reduction gear auxiliary slow speed driving mechanism shown in Fig. 1 functions.

In the modification of the invention shown in Fig. 3, the main driving motor 13 (shown schematically) is arranged to be controlled electrically in such manner that it may be stopped for effecting a gear changing operation in the transmission mechanism without requiring that the main clutch 18 be disengaged. This is accomplished by means of an electrical braking system adapted to reduce the speed of the motor rapidly, the arrangement being such that the main motor may be started automatically after the shifting operation has been completed to re-establish operation of the machine. The structure shown in Fig. 3 is generally similar to that illustrated in Fig. 2 in that it may be applied to a machine having either manually shiftable gearing or power shiftable gearing or both, connected to be driven by the transverse shaft 28 as previously explained. Likewise, the shifting operation may be effected by means of a single speed controlling crank 235 or by a plurality of speed controlling cranks similar to the cranks 46 and 55 shown in Fig. 1.

In this modification, the main driving motor 13 and the driving transmission including the main clutch and brake are generally similar to the corresponding parts shown in Figs. 1 and 2, the brake in this instance being represented by a cone type braking element 297 that is arranged to engage a complementary braking surface in the frame of the machine. The auxiliary electric motor 228 is operatively connected to drive the transmission mechanism by means of intermeshing bevel gears 298 and 299 which turn an irreversible drive mechanism 229 constituted by the worm 261 meshing with the worm wheel 260, as previously explained with reference to Figs. 2 and 7. The worm wheel 260 is connected, in this instance, to drive the main shaft 19 by means of an overrunning clutch 302, the arrangement being such that when the main shaft is being driven by the main motor 13, the clutch 302 permits the shaft to turn without interference from the worm wheel 260.

The main motor 13 may be controlled by means of a solenoid operated starting switch 305 that may be selectively operated to connect the motor to the supply line conductors L1, L2 and L3. To start the main motor 13, a normally open starting push button switch 306 is closed, thereby establishing a circuit from the line conductor L3 through a conductor 307, the closed starting switch 306, a normally closed stopping push button switch 308 and a conductor 309 to the solenoid of the switch 305, and thence through a conductor 310 to the line conductor L1. When the solenoid of the switch 305 is thus energized, the switch is moved upward to closed position thereby connecting the line conductors L1, L2 and L3 to conductors 311, 312 and 313 respectively and establishing a holding circuit in parallel with the starting switch 306. The conductors 311, 312 and 313 lead to a normally closed solenoid operated switch 315 which connects them with conductors 316, 317 and 318 respectively, leading to the main driving motor 13.

To stop the main motor 13, the normally closed push button switch 308 may be depressed, thereby opening the circuit through the conductor 309, the solenoid of the switch 305 and the conductor 310, and permitting the switch 305 to drop to its open or stop position. When the switch 305 is in the stop position, auxiliary contact members 320 and 321 associated with it close a circuit which extends from line conductors L2 and L3 through conductors 322 and 323 respectively, to a rectifier 324 and thence through conductors 325 and 326, the contact members 320 and 321 and conductors 327 and 328 to a time delay relay 329. From the relay 329, conductors 331 and 332 lead to the conductors 312 and 313 which are connected to one phase-winding of the main motor 13, the arrangement being such that when the switch 305 moves to stop position, the rectifier 324 applies direct current to one phase of the motor 13 to effect a braking action for stopping it, the direct current being continued for a limited time, determined by the setting of the time delay relay 329, sufficient to stop rotation of the motor.

When it is desired to effect a speed changing operation at a time when the machine is being driven by the main motor 13, the spring pressed latching plunger 246 is withdrawn, thereby moving the control rod 92 inwardly and closing a control switch 335. This completes a circuit from the line conductor L2 through a conductor 336, the closed switch 335 and the conductor 337, to the solenoid of the switch 315 and thence by a conductor 338 to the line conductor L3. When the solenoid of the switch 315 is thus energized, the switch is moved upward to open position, thereby interrupting the connection from the conductors 311, 312 and 313 to the conductors 316, 317 and 318 respectively leading to the main motor 13. At the same time, auxiliary contacts 340 and 341 on the switch 315 complete a circuit that leads from the rectifier 324 through a conductor 342 and auxiliary contact member 341, a conductor 343, the arm of a torque responsive switch 344 to a contact member 345 which is engaged by the switch arm whenever the motor 13 is rotating. From the contact member 345 a conductor 346 leads to the conductor 317, through one phase-winding of the motor 13, and thence by the conductor 318, to a conductor 347, the auxiliary contact 340 and a conductor 348 back to the rectifier 324. This connection applies direct current from the rectifier 324 to one phase of the motor 13 for braking it electrically, the braking current being maintained as long as the motor 13 continues to rotate and being discontinued as soon as the arm of the switch 344 moves out of contact with the contact member 345 when rotation of the motor ceases.

When the motor 13 stops, the arm of the switch 344 moves into engagement with a contact member 350, thereby completing a circuit from the rectifier 324 through conductor 342, contact member 341, conductor 343, switch arm 344, and contact member 350, to a conductor 351 leading to the solenoid of the auxiliary motor switch 271 and thence through a conductor 352 to the conductor 347 which is connected by the auxiliary contact member 340 to conductor 348 leading to the rectifier 324. This results in starting the auxiliary motor 228 automatically upon stopping the main motor 13, and since the braking circuit for the main motor has been interrupted by movement of the switch arm 344 out of engagement with the contact member 345, the auxiliary motor 228 is free to rotate the entire transmission mechanism including the main motor slowly by means of the bevel gears 298 and 299, the speed reducing worm 261 and worm wheel 260 and the overrunning clutch device 302 which now engages to effect a driving connection with the main shaft 19.

After the shifting movement has been completed, the latching plunger 246 is returned to latching position, thereby opening the control switch 335 and de-energizing the solenoid of the switch 315. This permits the switch 315 to drop to its closed position, thereby closing the circuit to the main motor 13, and opening the direct current control circuit which leads from the rectifier 324 through auxiliary contacts 340 and 341. With the direct current circuit open the solenoid of the switch 271 is de-energized and the circuit through it is opened thereby stopping the auxiliary motor 228. When the main motor 13 is energized by closing the switch 315, it resumes its driving action upon the pulley 15 and the main shaft 19, turning the shaft within the now stationary overrunning clutch 302 and re-establishing operation of the machine.

If it is desired to effect a speed changing adjustment when the machine is not running, for instance when the main clutch 18 is disengaged and the brake 297 is engaged, the unlatching movement of the latching plunger 246 closes the control switch 335 thereby stopping the main motor 13, (if it happens to be running) and starting the auxiliary motor 228 as previously explained. Further, the inward movement of the control rod 92 likewise moves the valve plunger 243 to the right thereby establishing a hydraulic circuit from the pump 77 through the pressure conduit 238, the valve port 240 and the valve groove 242 which then communicates with the port 247 connected to the conduit 248 that leads to a port 354 in the side of a clutch operating cylinder 355. As shown, the cylinder 355 is provided with a piston 356 which is connected by a piston rod 357 to a clutch shifting fork 358, the piston 356 being positioned at the left end of the cylinder 355 when the clutch is disengaged and the brake 297 is engaged. Under these conditions pressure fluid from the conduit 248 passes through the port 354 in the cylinder wall into a port 360 extending through the piston 356, in manner to exert pressure in the left end of the cylinder for forcing the piston to the right. The port 360 in the piston 356 is so positioned that it moves out of register with the port 354, thereby stopping further movement, as soon as the piston has been moved a sufficient distance to disengage the brake 297 and prior to its movement to the position at which the main clutch 18 is engaged. With the brake 297 moved to disengaged position, the auxiliary motor 228 is free to turn the transmission mechanism slowly during the shifting operation as previously explained. When the latching plunger 246 is returned to latching position, the initial condition of the mechanism is again re-established the auxiliary motor being stopped in response to opening of the control switch 335 and the hydraulic pressure being disconnected from the conduit 248 leading to the brake releasing cylinder 355, whereupon the pressure fluid in the left end of the cylinder escapes through a small leakage passageway or bleeder hole 361, and the brake 297 is returned to engaged position by the action of a spring detent plunger 362 upon a detent roller 363 mounted in a clutch actuating rod 364 secured to the shifting fork 358.

In the modification of the invention shown in Fig. 4, the main driving motor 13 is directly connected to the main driving shaft 19, thereby dispensing with the belt drive and friction clutch arrangement shown in the previously described embodiments. This directly connected motor and its associated auxiliary motor may be applied as a unit to drive any machine tool transmission mechanism, that may be driven by the motors shown in Figs. 1 and 2. For instance, the unit may be substituted in the structures shown in Figs. 1 and 2 for the belt driven connection and slow speed auxiliary drive mechanism there shown, the main drive shaft 19 being in this instance splined into a stub shaft 366 which carries the bevel pinion 26 constituting part of the reversing mechanism for driving the shaft 28 of the transmission mechanism.

The electric system for controlling the motor in this embodiment is substantially the same as that shown in Fig. 3, the arrangement being such that the main motor 13 may be stopped by the braking action of direct current from the rectifier 324 applied to one phase-winding of the motor, thereby dispensing with the necessity for a mechanical clutch and brake system. Two normally open control switches 367 and 368, corresponding generally to the control switch 335 shown in Fig. 3, are connected in parallel relationship in the motor controlling circuit in such manner that either may function to energize the solenoid of the motor controlling switch 315. These switches 367 and 368 may be arranged to be actuated respectively by a plurality of speed changing control levers such as the cranks 46 and 55 shown in Fig. 1, whereby the solenoid of the switch 315 will be energized upon unlatching movement of either speed changing lever. This results in conditioning the driving mechanism for a gear shifting operation by stopping the main motor 13 and starting the auxiliary motor 228 in the manner previously described.

As in the case of the structure shown in Fig. 3, the shifting operation may be effected regardless of whether or not the main motor 13 happens to be driving the speed changing mechanism at the time that the shifting operation is initiated. If the motor starting switch 305 is closed and the main motor 13 is running, closing of either the switch 368 or the switch 367 will energize the solenoid of the switch 315 thereby opening the power circuit to the motor 13 and closing the braking circuit to stop rotation of the mechanism. As soon as the motor 13 stops, the solenoid of the auxiliary motor switch 271 is energized by action of the torque responsive switch 344, thereby starting the auxiliary motor 228 to drive the shaft 19 slowly by means of the reduction gear train and the overrunning clutch 302 as previously explained. When the shifting operation is completed, the switch 315 closes, thereby starting the main motor 13 and de-energizing the auxiliary motor 228, the main motor 13 then resuming driving of the transmission mechanism with the clutch 302 overrunning, to re-establish the initial operating condition.

If it is desired to shift the gearing at a time that the switch 305 is open and the main motor 13, as well as the transmission gear train, is stationary, energization of the solenoid of the switch 315, while not having any effect upon the main motor, will close the control circuit to start the auxiliary motor for turning the gearing slowly during the shifting operation. Re-closing of the switch 315 at the completion of the shifting operation under these conditions will de-energize the auxiliary motor 228 but will not result in starting the main motor 13, since the starting switch 305 is in the open position.

In the modification of the invention shown in Fig. 5, both the main driving motor and the auxiliary motor are directly connected to turn with the transmission mechanism whenever it is running, the auxiliary motor being preferably mounted on the same shaft with the main motor and likewise, incorporated within the same housing structure. The directly connected main and auxiliary motor assembly may be substituted as a unit for any of the previously described driving units in any of various machine tool transmission mechanism such as the mechanisms shown in Figs. 1 and 2. As shown in Fig. 5, a main motor 370 having a special housing is provided with a shaft 371 that is directly connected at one end to the main driving shaft 19 and that is extended at its other end to constitute the shaft of an auxiliary slow speed driving motor 372. As in the structure shown in Fig. 4, the main shaft 19 has splined connection with the stub shaft 366 carrying the bevel pinion 26 which constitutes part of the reversing mechanism for driving the shaft 28 in either direction selectively. Electric energy for actuating the main and auxiliary motors is derived from line conductors L1, L2 and L3 which are connected respectively by conductors 373, 374 and 375 to a motor starting switch mechanism 376 that may be generally similar in operation to the starting switch 305 shown in Figs. 3 and 4. From the motor starting switch 376, motor energizing conductors 377, 378 and 379 extend to a motor controlling switch 380 which normally connects them to conductors 381, 382 and 383 leading to the main driving motor 370.

The control mechanism for effecting slow speed operation of the transmission mechanism includes in this instance two normally open control switches 387 and 388 connected in parallel and corresponding to the control switches 367 and 368 shown in Fig. 4, the arrangement being generally the same in that the control operation may be initiated by closing either switch, for instance by the unlatching movement of either of two levers such as the speed changing levers 46 and 55 shown in Fig. 1. When either of the switches 387 and 388 is closed preparatory to a speed changing operation, a circuit is established from the conductor 377 through a conductor 385 to the closed control switch 387 or 388 and thence by a conductor 386 to the solenoid of the motor controlling switch 380, from which a conductor 389 leads to the conductor 378. When the solenoid of the switch 380 is thus energized, the switch contact elements are moved upwardly thereby opening the circuit from the conductors 377, 378, and 379 to the conductors 381, 382 and 383 leading to the main driving motor 370 and de-energizing the motor. Other contact elements of the switch 380 then establish a three-phase circuit to the slow speed driving motor 372, the circuit extending from the conductor 377 through the conductor 385, a conductor 390 and the switch 380 to a conductor 391; from the conductor 378 through the conductor 389 a conductor 392 and the switch 380 to a conductor 393; and from the conductor 379 through a conductor 394 and the switch 386 to a conductor 395, thereby energizing the slow speed driving motor 372.

The slow speed auxiliary motor 372 may be of any type adapted to be run at low speed and need be capable of furnishing only sufficient power to turn the speed changing mechanism slowly while it is being shifted, the motor being constructed to withstand rotation at the full speed of the main driving motor 370 when the machine is being driven at normal operating speed. The auxiliary motor 372 may be of the multipolar type or of any other suitable design such as the bucking phase type shown diagrammatically in the drawings. As indicated, the conductors 391, 393 and 395 furnish energy to the usual main three-phase windings of the motor 372, while single phase current is taken from the conductor 391 through the primary of a bucking circuit transformer 397 and thence through a conductor 398 to the conductor 395. From the secondary of the transformer 397, the single phase current flows through a conductor 401, a voltage regulator 402 and a conductor 403 to a bucking phase winding 404 and thence by a conductor 405 back to the transformer secondary winding. By this arrangement the auxiliary motor 372 may be caused to rotate at a predetermined relatively slow speed adapted to facilitate the speed changing operation. Under some circumstances it may be found desirable to apply the bucking phase circuit directly to the main motor and to energize the bucking phase for reducing the speed of the main motor during gear shifting, or to otherwise control its operation to effect the desired slow speed of rotation, thereby dispensing with the auxiliary motor but perhaps at some sacrifice of operating efficiency and effectiveness in the main motor.

In the modification of the invention shown in Fig. 6, the arrangement is such that slow speed driving action during a speed changing operation may be effected without stopping or changing the speed of the main motor. This is accomplished by transmitting the driving torque of the main motor through a differential mechanism, and arranging the auxiliary motor to turn one element of the differential mechanism in manner to largely neutralize the driving effect of the main motor.

As shown, the shaft of the main motor 13 is directly connected to a shaft 408 that carries a bevel gear 409 constituting one element of a differential mechanism. The gear 409 meshes with a planetary bevel pinion 410 which meshes, in turn, with a bevel gear 411 disposed in opposition to the gear 409 and mounted on the main driving shaft 19. The intermediate planetary pinion 410 is rotatably mounted in and carried bodily by a spider 412 which is in turn rotatably mounted on the shaft 19. The spider 412 is provided with a worm wheel element 260 which meshes with a worm 261 rotatably mounted in a part of the machine frame forming a supporting bracket, as best shown in Fig. 7, the arrangement being such that the worm and worm wheel constitutes a self-locking or irreversible driving mechanism 229 which serves, during normal operation, to resist the reaction torque of the differential mechanism, in manner to maintain the spider 412 in fixed position. With the spider 412 carrying the planet pinion 410 held stationary, the bevel gear 411 and the main driving shaft 19 will be driven at the same speed that the shaft 408 and bevel gear 409 are driven by the motor 13, but in the opposite direction.

As in the structures shown in Figs 4 and 5, the main driving shaft 19 is, in this instance, splined to the stub shaft 366 which carries the bevel pinion 26 that meshes with the bevel pinion 27 mounted on the transmission shaft 28. Consequently, the driving effect of the main motor 13 is the same in this construction as in the previously described constructions, with the exception that the direction of rotation is reversed in the differential mechanism. Furthermore, with this unit it is not necessary to provide mechanical reversing apparatus, since the driving effect may be reversed by reversing the motor electrically to turn the mechanism in either direction selectively. As is the case with the other units the driving unit here shown may be substituted for any of the previously described units to drive either of the transmission mechanisms shown in Figs. 1 and 2 or any other appropriate mechanism.

When a speed changing operation is to be effected in a machine equipped with this driving mechanism, the auxiliary motor 228 is started while the main motor 13 continues to operate. The auxiliary motor in this case functions to turn the worm 261 by means of intermeshing bevel pinions 415 and 416, thereby turning the worm wheel 260 and the spider 412. The ratio of the gearing is preferably such that the spider 412 is turned at a speed somewhat less than one-half the speed of the main motor 13 and in the direction which results in largely neutralizing the driving effect of the main motor upon the differential mechanism, with the result that the transmission mechanism turns at the slow speed adapted to facilitate a shifting operation as long as both motors continue to operate.

Electric energy for operating the motors is derived from line conductors L1, L2 and L3 which may be connected by a reversing switch 420 to supply conductors 421, 422 and 423. The supply conductors 421, 422 and 423 lead to a motor starting switch 425 by means of which they may be selectively connected to conductors 426, 427 and 428 leading to the main motor 13. To start the motor 13, a normally open push button switch 430 is closed thereby completing a control circuit from the supply conductor 423 through a conductor 431, the closed starting switch 430, a normally closed stopping push button switch 432, and a conductor 433 to the solenoid of the motor switch 425 from which a conductor 434 leads to the supply conductor 421. When the solenoid of the switch 425 is energized, the switch is moved upward to closed position, thereby completing the circuit for starting the main motor 13. At the same time, an auxiliary contact element 435 on the switch 425 closes a holding circuit in shunt with the starting switch 430. The holding circuit extends from the supply conductor 423 through the conductor 431, a conductor 436, the auxiliary contact 435 and a conductor 437 to the stopping switch 432 and thence through the conductor 433, the solenoid, and the conductor 434 to the supply conductor 421, the circuit functioning to retain the switch 425 in closed position after the starting push button switch 430 has been released.

To stop the main motor 13, the stop switch 432 may be opened thereby de-energizing the solenoid and permitting the switch 425 to move to open position to disconnect the main motor from the supply line. When the switch 425 moves to its open position, an auxiliary contact member 438 thereon closes a control circuit leading from the supply conductor 423 through a conductor 439, the contact member 438 and a conductor 440, to the solenoid of a motor plugging switch 441 and thence by a conductor 442 to a pair of contact members 443 disposed at opposite sides of the arm of a torque responsive switch 444 on the motor 13. When the main motor 13 is rotating in either direction, the contact arm of the switch 444 establishes a circuit from one of the contact members 443 to one of a corresponding pair of contact members 445 which are both connected to a conductor 446 that leads to a conductor 448 connected to the supply conductor 422. When the solenoid of the switch 441 is thus energized and the switch closed, a reverse driving connection is established from supply conductors 421, 422 and 423 through conductors 447, 448 and 449 respectively, the switch 441, and conductors 451, 452 and 453 which connect respectively with conductors 428, 427 and 426 thereby effecting reversed or plugging connection between the supply conductors and the motor. With the connections thus reversed, energy is applied to the main motor 13 in a manner tending to turn it in the opposite direction, with the result that the motor is quickly stopped by plugging action. As soon as the motor 13 stops turning, the arm of the torque responsive switch 444 moves to neutral position thereby opening the circuit between the contact member 443 and the contact member 445. This de-energizes the solenoid of the plugging switch 441 and opens the reverse circuit to prevent operation of the motor in the reverse direction, the switch 444 being so arranged that it will not move to closed position again until the motor has been restarted and attains considerable speed.

The control system for starting the auxiliary motor 228 is in this instance arranged to be energized only when the main motor 13 is operating. To this end, actuating current is derived from the motor conductors 426, 427 and 428, when the starting switch 425 is closed, by conductors 456, 457 and 458 respectively, which are adapted to be connected by an auxiliary switch 460 to conductors 461, 462 and 463 respectively leading to the motor 228. The slow speed control circuit, like the circuits shown in Figs. 4 and 5, contains two normally open switches 467 and 468 arranged in parallel relationship. When either of these switches is closed by an unlatching movement of its corresponding control lever, it establishes a circuit from the conductor 458 to the solenoid of the switch 460 from which a conductor 469 leads to the conductor 456, the circuit functioning to close the switch 460 and thereby energize the motor 228. As in the case of the previously described constructions, any one of the auxiliary motor control switches may be closed in response to a shifting movement of a single speed controlling lever or by the movement of any one of a plurality of speed controlling levers, the motor 228 then functioning to drive the differential spider 412, as previously explained, in manner to reduce the driving effect of the main motor for turning the transmission mechanism slowly while it is being shifted.

When the shifting operation is completed, and the levers are returned to latched position thereby opening both of the switches 467 and 468, the solenoid of the auxiliary switch 460 is de-energized and the switch opened to disconnect the auxiliary motor 228. When the motor 228 is de-energized, it drifts to a stop, and as the spider 412 slows down, the driving effect of the main motor 13 increases gradually thereby bringing the transmission mechanism up to speed. As soon as the spider 412 stops turning the normal driving speed is resumed, the spider then being held stationary by the irreversible worm and worm wheel connection 229, as previously explained.

Although the arrangement shown is such that the slow speed driving effect is attained with both motors running, it is to be understood that the control mechanism and the proportions of the gearing could be changed readily to provide for turning the spider 412 in such manner as to effect slow speed driving of the transmission mechanism by the auxiliary motor while the main motor 13 is stopped, as in the previously described embodiments shown in Figs. 3 and 4. Furthermore, the gearing and control apparatus could be arranged to function automatically in manner to provide slow speed operation either with the main motor running or with the main motor stationary, thereby providing for speed changing regardless of whether or not the machine is in operation at the time that the speed changing movement is initiated.

From the foregoing descriptions of the several machine tool driving mechanisms constructed in accordance with the principles of the present invention, it should be apparent that there has been provided improved driving and control means for machine tools arranged to effect speed changing operations conveniently and in an expeditious manner.

Although the several illustrated modifications of the invention have been described in considerable detail for the purpose of fully disclosing operative embodying apparatus, it is to be understood that the particular structures shown and described are intended to be illustrative only, and that the various inventive features may be incorporated in other structural forms without departing from the spirit and scope of the invention as defined in the subjoined claims.

The principles of the illustrative apparatus having now been fully explained, we hereby claim as our invention:

1. In a machine tool having an adjustable speed changing transmission mechanism, the combination with a main driving motor and an auxiliary motor arranged to actuate said transmission mechanism alternatively, of an electrical control system including a switch associated with means operative to adjust said transmission mechanism, said control system being operative upon initiating an adjusting movement to deenergize said main driving motor and energize said auxiliary motor automatically for effecting slow movement of said speed changing mechanism to facilitate adjustment thereof.

2. In a machine tool having an adjustable speed changing power transmission mechanism, the combination with a control lever for adjusting said mechanism, of latching means for latching said lever in adjusted position, a primary source of power for driving said mechanism at normal operating speed, a secondary source of power for turning said mechanism slowly to facilitate adjustment thereof, and a control system operative in response to unlatching movement of said lever latching means to stop the driving effect of said primary source of power and start the turning effect of said secondary source of power to turn said mechanism slowly during adjustment thereof resulting from a subsequent shifting movement of said lever.

3. In a machine tool having an adjustable transmission mechanism, the combination with electrical means for driving said mechanism, of means for effecting adjustment of said transmission mechanism, and control means including a switch associated with said adjusting means and operative upon a circuit controlling said electrical driving means prerequisite to an adjusting operation to effect slow movement of said transmission mechanism to facilitate adjustment thereof.

4. In a machine tool having an adjustable transmission mechanism, the combination with means for driving said mechanism, of an electrical control system including a switch responsive to a movement incident to an adjustment of said mechanism and operative to energize an electric motor to effect slow rotation thereof for facilitating the adjustment.

5. In a machine tool having an adjustable variable speed power transmission mechanism, the combination with means for driving said mechanism at normal operating speed, of means for turning said mechanism slowly to facilitate adjustment thereof, and an electrical control system including a switch operative prerequisite to a speed adjusting movement for closing a circuit to render effective said means for turning said mechanism slowly.

6. In a machine tool having an adjustable speed changing transmission mechanism, the combination with a driving motor adapted to drive said mechanism either at a normal operating speed or at a relatively slow speed, of speed changing control apparatus arranged to effect operation of said motor at either of said speeds, whereby said mechanism may be actuated selectively at slow speed to facilitate adjustment thereof.

7. In a machine tool having an adjustable power transmission mechanism, a main driving motor selectively operable to drive said mechanism at normal operating speed, an auxiliary motor for turning said mechanism slowly, and an over-running clutch operatively connecting said auxiliary motor to said transmission mechanism in such manner that said mechanism may operate independently of said auxiliary motor whereby said auxiliary motor may become operative selectively when said main motor is not driving said mechanism to turn said mechanism at slow speed for facilitating adjustment thereof.

8. In a machine tool transmission mechanism including a variable speed device, the combination with a main driving motor arranged to drive said mechanism at normal operating speed, of an auxiliary motor arranged to turn said mechanism slowly, control means operative selectively to reduce the speed of said main motor rapidly and stop it prerequisite to a speed changing operation, and control means functioning after said main motor has stopped to start said auxiliary motor for slowly turning said variable speed device while it is being adjusted.

9. A machine tool comprising a speed changer, a transmission train operative to drive said speed changer, a primary power source connected to actuate a part of said train in manner to drive said speed changer at normal operating speed, and an auxiliary power source selectively operative to actuate another part of said transmission train simultaneously with said primary source and effective to reduce the speed at which said speed changer is driven to a slow speed adapted to facilitate adjustment thereof.

10. In a machine tool having a rotatable member arranged to be driven at different speeds, a transmission train including a differential mechanism having one element connected to drive said rotatable member, a self-locking driving gear operatively connected to a second element of said differential mechanism and operative to prevent reactive rotation thereof, a main driving power source connected to actuate a third element of said differential mechanism in manner to drive said first element and said driven member at a predetermined speed with said second element stationary, and an auxiliary power source connected to actuate said self-locking driving gear for rotating said second differential element in manner to change the speed of rotation of said driven member.

11. In a machine tool, the combination with a transmission mechanism having a plurality of elements adjustable by separate manually operable speed changing levers, of slow speed driving mechanism for turning said transmission mechanism slowly to facilitate speed changing, and control means responsive to movement of any one of said plurality of levers prerequisite to a speed changing operation and operative to render said slow speed driving mechanism effective to turn said transmission mechanism.

12. In a machine tool, the combination with a transmission mechanism having a plurality of manually operable speed changing levers and a main motor operatively connected to drive said mechanism, of an auxiliary motor operative to turn said transmission mechanism slowly to facilitate speed changing, and control apparatus responsive to movement of any one of said plurality of manually operable levers prerequisite to a speed changing operation and operative to render said auxiliary motor effective to turn said transmission mechanism.

13. In a machine tool having an adjustable transmission mechanism including shiftable gearing, driving means for said mechanism including an auxiliary drive apparatus arranged to drive said mechanism at a low rate of speed to facilitate gear shifting, and a plurality of control levers arranged to cooperate in shifting said gearing, each of said levers functioning to render said auxiliary drive apparatus operative prior to a shifting movement to cause said gearing to turn slowly while being shifted.

14. In a transmission and control mechanism for a machine tool, the combination with a variable speed device and a range changer arranged in series relationship, of a speed-selecting member associated with said variable speed device and having a latching device arranged to latch said member in any one of several positions corresponding to the several speeds which may be effected by said variable speed device, a second speed selecting member associated with said range changer and likewise having a latching device arranged to latch said member in any one of several positions corresponding to the several speeds which may be effected by said range changer, means responsive to unlatching movement of either of said latching devices to cause slow rotation of said variable speed device and said range changer, means responsive to movement of said speed selecting members to adjust said variable speed device and said range changer respectively while they are rotating slowly, and means effective upon subsequent movement of both said latching devices to latching position to discontinue slow rotation of said variable speed device and said range changer.

15. In a machine tool having an adjustable speed changing power transmission mechanism, a primary source of power selectively connectible to drive said mechanism at normal operating speed, means to adjust said speed changing mechanism, a secondary source of power for turning said mechanism slowly while it is being adjusted, a self-locking drive mechanism connected to be driven by said secondary source of power, and a friction coupling selectively operable to connect said self-locking drive mechanism to said speed changing mechanism, said friction coupling first functioning as a brake reacting against said self-locking mechanism to check the speed of said speed changing mechanism and then functioning as a clutch driven by said self-locking mechanism to drive said speed changing mechanism at slow speed to facilitate adjustment thereof.

16. In a machine tool transmission and control mechanism, the combination with a speed changing mechanism and controllable driving mechanism therefor, of a speed selecting control apparatus for adjusting said speed changing mechanism, a slow speed driving mechanism to facilitate said speed changing adjustment including an irreversible driving element, a friction clutch disposed to connect said slow speed irreversible driving element to said speed changing mechanism, and means operative by said speed selecting control apparatus to render said controllable driving mechanism inactive and to engage said slow speed friction clutch to connect said slow speed irreversible driving element to said speed changing mechanism prior to a speed selecting adjustment thereof, whereby the speed of said mechanism may be reduced promptly by reaction of said friction clutch against said irreversible element to that at which the subsequent speed selecting adjustment is facilitated.

17. In a machine tool comprising a selective speed changing mechanism, a primary electric motor selectively operable to drive said mechanism at normal operating speed, an auxiliary motor selectively operable to turn said mechanism at slow speed to facilitate adjustment thereof, power operated shifting means disposed to adjust said selective speed changing mechanism, and a single control member operative to discontinue the driving effect of said primary motor, to cause said auxiliary motor to turn said mechanism, and to cause said power operated shifting means to adjust said selective speed changing mechanism while it is being turned slowly by said auxiliary motor.

18. A machine tool driving apparatus comprising an adjustable speed changing mechanism, a main motor directly connected to drive said speed changing mechanism at normal operating speed, an auxiliary motor operative to drive said speed changing mechanism at slow speed to facilitate adjustment thereof, means including an overrunning clutch arranged to connect said auxiliary motor to drive said speed changing mechanism, and a control system including sequentially operating means to stop said main motor and subsequently start said auxiliary motor, whereupon said overrunning clutch then engages to turn said main motor and said speed changing mechanism at slow speed to facilitate speed changing.

19. In a machine tool having an adjustable power transmission mechanism, a main driving motor, a differential mechanism operatively connecting said main driving motor to said transmission mechanism for driving it at normal operating speed, an auxiliary motor operatively connected to said differential mechanism for driving it selectively in manner largely to neutralize the driving effect of said main motor, means for effecting adjustment of said transmission mechanism, and means responsive to movement of said adjusting means to energize said auxiliary motor, whereby said transmission mechanism may be turned at slow speed to facilitate adjustment thereof.

20. In a machine tool including a plurality of speed changing mechanisms, the combination with independent shifting elements for adjusting said speed changing mechanisms respectively, of a primary source of power selectively operable to drive said speed changing mechanisms at normal operating speed, a secondary source of power selectively operable to turn said mechanisms slowly, and means associated with said shifting elements and operative upon movement of any one of them in initiating a speed changing movement to render said primary power source inoperative and said secondary power source operative to thereby turn said speed changing mechanisms at a slow speed adapted to facilitate said speed changing movement.

21. In a machine tool speed changing transmission mechanism, the combination with a source of power, a variable speed device and a range changer selectively connectible to be driven at normal operating speed by said source of power, and a slow speed driving device, of a speed selecting control device operatively connected to adjust said variable speed device, a second speed selecting control device operatively connected to adjust said range changer, and means operative upon initiating a speed-selecting movement of either one of said control devices to disconnect said source of power from its normal driving connection with said transmission mechanism and to engage said slow speed driving device to turn said transmission mechanism slowly during adjustment of either said variable speed device or said range changer.

22. A machine tool comprising driving mechanism including a plurality of speed changing devices arranged in series relationship, a plurality of shifting members operatively connected to adjust said speed changing devices respectively, a source of power selectively connectible to drive said mechanism at normal operating speed, an auxiliary source of power selectively connectible to turn said mechanism slowly to facilitate adjustment of said speed changing devices, and control apparatus associated with said shifting members and operative upon movement of any one of them to disconnect said normal speed power source and to connect said auxiliary power source for turning said mechanism slowly while said shifting member is effecting adjustment of its corresponding speed changing device.

23. In a machine tool having an adjustable transmission mechanism including a plurality of speed changing devices arranged in series relationship, driving means for said mechanism including an auxiliary drive apparatus arranged to turn said mechanism at low speed to facilitate adjusting said speed changing devices, and a plurality of control elements arranged to effect adjusting of said speed changing devices respectively and each operative to engage said auxiliary drive apparatus prior to a speed changing operation to cause said speed changing devices to turn slowly while being adjusted.

24. In a machine tool provided with two speed changing transmission mechanisms arranged in series relationship, a speed-selecting member for controlling each of said speed changing mechanisms independently, and means operative prerequisite to a speed-selecting movement of either of said speed-selecting members to cause slow rotation of both of said mechanisms to facilitate adjustment thereof.

25. In a machine tool having an adjustable speed changing mechanism, the combination with a main motor operatively connected to drive said mechanism selectively at normal operating speed, of an auxiliary motor operatively connected to drive said mechanism selectively at slow speed to facilitate adjustment thereof, and control apparatus for adjusting said speed changing mechanism including means to stop said main motor and start said auxiliary motor prior to a speed changing operation comprising a plurality of movable members, a switch operative upon movement of any one of said members to stop said main motor, a switch operative upon stopping of said main motor to start said auxiliary motor, and means actuated by movement of said control member to adjust said speed changing mechanism while it is being turned slowly by said auxiliary motor.

26. A slow speed driving apparatus for turning the speed changing transmission mechanism of a machine tool to facilitate adjustment thereof, comprising a driving power source normally operating at relatively high speed, a gear reduction train including a self-locking irreversible element operatively connected to be driven by said power source and functioning to provide a low speed of movement, and a friction clutch disposed to connect said irreversible element of said train to said speed changing transmission mechanism, said friction clutch functioning first as a brake reacting against said irreversible element to check the speed of said mechanism and then as a driving member to rotate said mechanism slowly while it is being adjusted.

27. In a machine tool having a rate changer, the combination with means including a disconnecting device arranged to operate said rate changer at normal speed, of auxiliary driving mechanism including irreversible self-locking gearing disposed to operate said rate changer at slow speed to facilitate adjustment thereof, a friction clutch disposed to connect said auxiliary driving mechanism to said rate changer, and means to disengage said disconnecting device and engage said friction clutch, said friction clutch functioning as a brake reacting against said irreversible gearing to reduce the speed of said rate changer.

28. In a machine tool having an adjustable rate changing power transmission mechanism, in combination, means to drive said transmission mechanism at normal operating speed including a power operated main clutch, an auxiliary motor for actuating said transmission mechanism at slow speed to facilitate adjustment thereof, an overrunning clutch device disposed to operatively connect said auxiliary motor to said transmission mechanism, and power means to operate said main clutch, whereby said mechanism may be driven at normal speed by means of said main clutch with said auxiliary clutch overrunning, said auxiliary motor becoming operative through said overrunning clutch only when said power operated main clutch is disengaged to disconnect said normal speed driving means from said transmission mechanism.

29. In a machine tool having a selective speed changing mechanism, a source of power selectively connectible to drive said mechanism, power operated shifting means arranged to adjust said selective speed changing mechanism, and a single control member movable to effect sequentially disconnection of said power source from said mechanism and then operation of said power shifting means to adjust said mechanism while it is disconnected from said power source.

30. In a machine tool having a selective speed changing mechanism, a primary source of power selectively connectible to drive said mechanism at normal operating speed, power operated shifting means arranged to adjust said selective speed changing mechanism, a secondary source of power selectively operable to turn said mechanism at slow speed to facilitate adjustment thereof, and a single control member movable to effect sequentially disconnection of said primary power source, operation of said secondary power source to turn said mechanism slowly and operation of said power shifting means to adjust said mechanism while it is disconnected from said primary power source and is being turned slowly by said secondary power source.

31. In a machine tool having adjustable transmission mechanism, the combination with main driving means for said mechanism, of an auxiliary driving motor, an overrunning clutch operatively connecting said auxiliary motor to said mechanism, said auxiliary motor being arranged to drive said mechanism slowly by means of said clutch when said main driving means is not operating to drive said mechanism, a control system including braking means for checking the speed of rotation of said transmission mechanism, and means for energizing said auxiliary motor to turn said mechanism at slow speed for facilitating adjustment thereof.

32. In a machine tool having an adjustable rate changing power transmission mechanism, the combination with a main electric motor operatively connected to drive said mechanism at normal operating speed and an auxiliary electric motor operative to turn said transmission mechanism slowly for facilitating adjustment thereof, of an electric control system operative to deenergize said main motor and subsequently energize said auxiliary motor in preparation for adjustment of said rate changing mechanism, and a single control member operative to adjust said rate changing mechanism and functioning prerequisite to a rate changing movement to effect operation of said control system, whereby said main motor may be stopped and said auxiliary motor started in sequence prior to an adjusting movement in order that said mechanism may be turned slowly during adjustment.

33. In a machine tool having an adjustable power transmission mechanism, a primary electric motor selectively operable to drive said transmission mechanism at normal operating speed, an auxiliary electric motor selectively operable to cause said transmission mechanism to operate at slow speed for facilitating adjustment thereof, a control system for said motors including means to plug said primary motor to stop it quickly, means to prevent reverse operation of said primary motor at the termination of a plugging action, and means to prevent operation of said auxiliary motor except when said primary motor is operating, said auxiliary motor functioning to partly neutralize the driving effect of said primary motor for reducing the speed of operation of said transmission mechanism.

34. In a machine tool having an adjustable power transmission mechanism, a main electric motor operable to drive said transmission mechanism at normal operating speed, an auxiliary power source operable to turn said transmission mechanism slowly for facilitating adjustment thereof, electrical control means operative selectively to brake said main motor electrically in manner to stop it quickly prerequisite to a speed changing adjustment, and control means functioning after said main motor has stopped to energize said auxiliary power source for turning said transmission mechanism slowly during speed changing.

35. In a machine tool having an adjustable power transmission mechanism including shiftable gearing, the combination with a main motor operatively connected to drive said gearing at normal operating speed and an auxiliary electric motor operative to turn said gearing slowly for facilitating shifting thereof, of an electric control system operative to de-energize said main motor and subsequently energize said auxiliary motor in preparation for adjustment of said transmission mechanism, and a single control member operative to shift said shiftable gearing and functioning prerequisite to a shifting movement to effect operation of said control system, whereby said main motor is stopped and said auxiliary motor is started in sequence prior to a shifting movement to turn said shiftable gearing slowly during shifting thereof.

36. In a machine tool, the combination with an adjustable transmission mechanism and a source of power for driving said mechanism, of means selectively operative to cause said source of power to drive said mechanism, control means operative to effect adjustment of said mechanism, means associated with said control means and operative to change the speed of operation of said mechanism to a slow speed adapted to facilitate adjustment thereof upon the initiation of an adjusting action regardless of whether or not said mechanism is being driven by said source of power at the time said adjusting action is initiated, and means associated with said control means and operative after said adjusting action has been completed to restore the driving relationship between said mechanism and said source of power to that which obtained prior to said adjusting action.

37. In a machine tool having an adjustable power transmission mechanism, the combination with main driving means selectively operable to drive said transmission mechanism at normal operating speed, of an auxiliary motor for driving said mechanism at slow speed, and an overrunning clutch operatively connecting said auxiliary motor to said transmission mechanism, the arrangement being such that said clutch will overrun when said transmission is being driven by said main driving means and will become operative when said transmission is not being driven by said main driving means to connect said auxiliary motor to turn said mechanism at a slow speed adapted to facilitate adjustment thereof.

38. In a machine tool having an adjustable power transmission mechanism, the combination with a main motor operatively connected to drive said mechanism selectively at normal operating speed, of an auxiliary motor operatively connected to drive said mechanism selectively at a slow speed adapted to facilitate adjustment thereof, and control apparatus for adjusting said transmission mechanism, said apparatus comprising a movable member, a switch responsive to movement of said member and operative to stop said main motor, a switch responsive to stopping of said main motor and operative to start said auxiliary motor, and means actuated by said movable member to adjust said transmission mechanism while it is being turned slowly by said auxiliary motor.

39. In a machine tool having an adjustable power transmission mechanism, the combination with power driving means selectively operable to turn said mechanism at normal speed, of auxiliary driving apparatus for turning said mechanism at slow speed to facilitate adjustment thereof, said apparatus including irreversible self-locking gearing, and a friction coupling selectively engageable to connect said self-locking gearing to said transmission mechanism, said friction coupling functioning when engaged preliminarily to an adjusting operation first as a brake reacting against said self-locking gearing to reduce the speed of said transmission mechanism and then as a clutch to rotate said mechanism slowly while it is being adjusted.

40. In a machine tool, the combination with an adjustable power transmission mechanism, a source of power selectively operative to drive said mechanism, and a brake selectively engageable to stop said mechanism, of control means operative to adjust said mechanism including means to discontinue the driving effect of said source of power and engage said brake in preparation for an adjusting action, and auxiliary driving means operative to turn said brake bodily at slow speed to drive said mechanism slowly for facilitating adjustment thereof.

41. In a machine tool, the combination with a driven element, a source of power, and an adjustable transmission mechanism disposed to connect said source of power to actuate said driven element, of power actuated means operable to adjust said transmission mechanism, control means connected to control said power actuated adjusting means, an auxiliary driving apparatus adapted to drive said transmission mechanism at slow speed to facilitate adjustment thereof, means operative in response to an initial movement of said control means to cause said source of power to discontinue driving said mechanism and to bring into operation said auxiliary driving apparatus, and means operative in response to an adjusting movement of said control means to apply power to said power actuated adjusting means while said transmission mechanism is being driven at low speed by said auxiliary driving apparatus thereby to urge said mechanism into the preselected adjustment as soon as it is turned to a position permitting such adjusting movement.

42. In a machine tool, the combination with a driven adjustable transmission mechanism, a main motor operatively connected to drive said mechanism at operating speed and an auxiliary motor, of a control system for said motors including a switch selectively operable to energize said main motor, means associated with said switch arranged to apply a braking force to said motor upon movement of said switch to a position in which said motor is de-energized, and a torque responsive device associated with said main motor and operative to release said braking force when said motor ceases turning and to energize said auxiliary motor to rotate said transmission mechanism slowly for facilitating its adjustment.

JOSEPH B. ARMITAGE.
THEODORE F. ESERKALN.